(12) United States Patent
Tomalia et al.

(10) Patent No.: US 7,977,452 B2
(45) Date of Patent: Jul. 12, 2011

(54) JANUS DENDRIMERS AND DENDRONS

(75) Inventors: Donald A. Tomalia, Midland, MI (US);
Veera Reddy Pulgam, Mt. Pleasant, MI (US); Douglas R. Swanson, Mt. Pleasant, MI (US); Boahua Huang, Ann Arbor, MI (US)

(73) Assignee: Dendritic Nanotechnologies, Inc., Midland, MI (US)

( * ) Notice: Subject to any disclaimer, the term of this patent is extended or adjusted under 35 U.S.C. 154(b) by 733 days.

(21) Appl. No.: 11/885,244

(22) PCT Filed: Mar. 27, 2006

(86) PCT No.: PCT/US2006/011160
§ 371 (c)(1),
(2), (4) Date: Aug. 28, 2007

(87) PCT Pub. No.: WO2006/105043
PCT Pub. Date: Oct. 5, 2006

(65) Prior Publication Data
US 2008/0221300 A1      Sep. 11, 2008

Related U.S. Application Data

(60) Provisional application No. 60/665,698, filed on Mar. 28, 2005, provisional application No. 60/728,137, filed on Oct. 19, 2005.

(51) Int. Cl.
*C08G 75/00* (2006.01)
(52) U.S. Cl. ........ 528/373; 528/363; 528/397; 528/423; 528/425; 525/410; 525/419
(58) Field of Classification Search .................. 528/373, 528/363, 397, 423, 425; 525/410, 419
See application file for complete search history.

(56) References Cited

U.S. PATENT DOCUMENTS

| | | | |
|---|---|---|---|
| 5,886,127 A | 3/1999 | Newkome et al. | |
| 6,020,457 A * | 2/2000 | Klimash et al. | 528/373 |
| 6,287,765 B1 | 9/2001 | Cubicciotti | |
| 6,664,315 B2 * | 12/2003 | Tomalia et al. | 523/218 |
| 2004/0109842 A1 | 6/2004 | Baker et al. | |
| 2004/0262585 A1 | 12/2004 | Cummins et al. | |

FOREIGN PATENT DOCUMENTS
WO       WO01/91816 A1    12/2001

OTHER PUBLICATIONS

Ian K. Martin and Lance J. Twyman, Tetrahedron Letters 42, 1119-1121 (2001).
Hartmuth C. Kolb, M.G. Finn, and K. Barry Sharpless, Angew. Chem. Int. Ed. 40, 2004-2021 (2001).
Keigo Aoi, Katsuhito Itoh and Masahiko Okada, Macromolecules 30, 8072-8074 (1997).
Ying-Chun Chen, Tong-Fei Wu, Lin Jiang, Jin-Gen Deng, Hui Liu, Jin Zhu, and Yao-Zhong Jiang, J. Org. Chem., 70, 1006-1010 (2005).
Valerie Maraval, Regis Laurent, Bruno Donnadieu, Monique Mauzac, Anne-Marie Caminade, and Jean-Pierre Majoral, J. Am. Chem. Soc. 122, 2499-2511 (2000).
Paul Furuta and Jean M. J. Frechet, J. Chem. Soc. 125, 13173-13181 (2003).
Elizabeth R. Gillies and Jean M. J. Frechet, J. Chem. Soc. 124, 14137-14146 (2002).
E. C. Wiener, M. W. Brechbiel, H. Brothers, R.L. Magin, O. A. Gansow, D.A. Tomalia, and P.C. Lauterbur, Magnetic Resonance in Medicine 31(1), 1-8 (Jan. 1, 1994).
D. A. Tomalia, B. Huang, D. R. Swanson, H. M. Brothers, II, and J. W. Klimash, Tetrahedron 59, 3799-3813 (2003).
Mauro Botta et al., Org. Biomol. Chem., 2, 570-577 (2004).
Brent M. Znosko, Mark E. Burkard, Thomas R. Krugh and Douglas H. Turner, Biochemistry 41, 14978-14987 (2002).
Elizabeth R. Gillies and Jean M. J. Frechet, J. Org. Chem. 69, 46-53 (2004).
Cordell R. DeMattei, Baohua Huang, and Donald A. Tomalia, Nano Lett. 4(5), 771-777 (2004).
Jarmo Ropponen, Sami Nummelin, and Kari Rissanen, Org. Lett. 6(15), 2495-2497 (2004).
E.R. Gillies and Jean M.J. Frechet, J. Am. Chem. Soc. 124, 14137-14146 (2002).

* cited by examiner

*Primary Examiner* — James Seidleck
*Assistant Examiner* — Gregory Listvoyb
(74) *Attorney, Agent, or Firm* — Technology Law, PLL; Karen L. Kimble

(57) ABSTRACT

This invention provides a cost effective process and new Janus dendrimers where at least two dendrons are attached at the core (with or without a connector group) and where at least two of the dendrons have different functionality. Preferred are those Janus dendrimers where at least one dendron is a PEHAM dendron. Thus these Janus dendrimers are heterobifunctional in character and use unique ligation chemistry with single site functional dendrons, di-dendrons and multi-dendrons. Also included are Janus dendrons which may be used as intermediates to make the Janus dendrimers or to further react with another reactive moiety. These Janus dendrimers can provide several new dendrimer moieties, namely: combinatorial libraries of bifunctional structures; combined target director and signaling dendrimers; specific targeting entities for diagnostic and therapeutic applications, such as for example targeted MRI agents, targeted radionuclide delivery for diseases such as cancer, and targeted photosensitive or radiowave sensitive agents.

7 Claims, 11 Drawing Sheets

| Gen | No. of NH₂ Surface Groups | Molecular Formula | MW | Hydrodynamic Diameter (nm) |
|---|---|---|---|---|
| 0 | 4 | $C_{24}H_{52}N_{10}O_4S_2$ | 609 | 1.5 |
| 1 | 8 | $C_{64}H_{132}N_{26}O_{12}S_2$ | 1,522 | 2.2 |
| 2 | 16 | $C_{144}H_{292}N_{58}O_{28}S_2$ | 3,348 | 2.9 |
| 3 | 32 | $C_{304}H_{612}N_{122}O_{60}S_2$ | 7,001 | 3.6 |
| 4 | 64 | $C_{624}H_{1252}N_{250}O_{124}S_2$ | 14,307 | 4.5 |
| 5 | 128 | $C_{1264}H_{2532}N_{506}O_{252}S_2$ | 28,918 | 5.4 |
| 6 | 256 | $C_{2544}H_{5092}N_{1018}O_{508}S_2$ | 58,140 | 6.7 |
| 7 | 512 | $C_{5104}H_{10212}N_{2042}O_{1020}S_2$ | 116,585 | 8.1 |

$Z$ = monomer-shell-saturation level, $N_c$ = core (cystamine) multiplicity, $N_b$ = branch-cell (BC) multiplicity, $G$ = generation.

JANUS DENDRIMERS AND DENDRONS

CROSS REFERENCE TO RELATED APPLICATIONS

The present invention is related to U.S. Provisional Applications 60/665,698, filed Mar. 28, 2005 and 60/728,137, filed on Oct. 19, 2005 and from which applications this application claims priority.

FEDERALLY SPONSORED RESEARCH STATEMENT

This invention was made with Government support under DAAL-01-1996-02-044 and W911NF-04-2-0030 awarded by The Army Research Laboratory Contract by the Department of Defense. The Government has certain rights in this invention.

FIELD OF THE INVENTION

The present invention concerns Janus dendrimers and processes to make them. The Janus dendrimers are heterobifunctional in character and use unique ligation chemistry with single site functional dendrons, di-dendrons and multi-dendrons. These Janus dendrimers can provide several new dendrimer moieties, namely, for example: combinatorial libraries of bifunctional structures; combined targeting and signaling dendrimers; specific targeting entities for diagnostic and therapeutic applications, such as for example, targeted MRI, targeted near infrared (IR) signaling agents, targeted radionucleotide delivery for diseases such as cancer, and targeted photosensitive or radiowave sensitive agents.

BACKGROUND OF THE INVENTION

Since the initial creation of dendrimers in the early 1980s, these precise, core-shell nano-constructs have become widely accepted as perhaps the most important members of the recently recognized fourth major architectural class of macromolecules known as dendritic polymers. [For example, see *Dendrimers and Other Dendritic Polymers*, eds. Jean J. Fréchet and Donald A. Tomalia, pub. John Wiley & Sons, Ltd. (2001), pp. 14-15; D. A. Tomalia, et al., *Polym. J. (Tokyo)*, 17, 117-32 (1985); and D. A. Tomalia, *Prog. Polym. Sci.*, 30, 294-324 (2005).] Particular interest is focused on the subclass, dendrimers, in that they represent a broad range of organic/organo-metallic compositions and architectures that may be structurally controlled as a function of (a) size, (b) shape, (c) flexibility and (d) surface chemistry in the nanoscale region [see D. A. Tomalia, et al., *Angew. Chem.*, 102(2), 119-57, (1990); and *Angew. Chem. Int. Ed. Engl.*, 29(2), 138-75, (1990)]. It is from this perspective that dendrimers are viewed as fundamental, nanometer-sized building blocks [see D. A. Tomalia, *Advanced Materials*, 6(7/8), 529 (1994); and "Dendrimers—An Enabling Synthetic Science to Controlled Organic Nanostructures," D. Tomalia, R. Esfand, K. Mardel, S. A. Henderson, G. Holan, Chapter 20 in *Handbook of Nanoscience, Engineering and Technology* (W. A. Goddard III, D. W. Brenner, S. E. Lyshevski, G. J. Irafrate, eds.) CRC Press, Boca Raton, 20.1-20.34 (2002); and D. A. Tomalia, *Prog. Polym. Sci.*, 30, 294-324 (2005)] that enable the construction of a wide range of nanoscale complexity/devices exhibiting important uses and properties in many fields including but not limited to the biomedical [discussed in "Dendrimers—An Enabling Synthetic Science to Controlled Organic Nanostructures," D. Tomalia, R. Esfand, K. Mardel, S. A. Henderson, G. Holan, Chapter 20 in *Handbook of Nanoscience, Engineering and Technology* (W. A. Goddard III, D. W. Brenner, S. E. Lyshevski, G. J. Irafrate, eds.) CRC Press, Boca Raton, 20.1-20.34 (2002); and R. Esfand, et al., *Drug Discovery Today*, 8(6), 427-436 (2001); and *Dendrimers and Other Dendritic Polymers*, eds. Jean J. Fréchet and Donald A. Tomalia, pub, John Wiley & Sons, Ltd. (2001)], nano-electronics, advanced materials [for example in D. A. Tomalia, *Advanced Materials*, 6(718), 529 (1994); and R. Esfand, et al., *Drug Discovery Today*, 8(6), 427-436 (2001)], and nano-catalyst fields *Dendrimers and Other Dendritic Polymers*, eds. Jean J. Fréchet and Donald A. Tomalia, pub. John Wiley & Sons, Ltd. (2001); "Dendrimers—An Enabling Synthetic Science to Controlled Organic Nanostructures," D. Tomalia, R. Esfand, K. Mardel, S. A. Henderson, G. Holan, Chapter 20 in *Handbook of Nanoscience, Engineering and Technology* (W. A. Goddard III, D. W. Brenner, S. E. Lyshevski, G. J. Irafrate, eds.) CRC Press, Boca Raton, 20.1-20.34 (2002); G. R. Newkome, et al., *Dendritic Molecules*; VCH: Weinheim, 1996; and F. Zeng, et al., *Chem. Rev.* 97, 1681-1712 (1997)].

Covalent construction of dendrimers by the assembly of reactive monomers [see for example D. A. Tomalia, *Scientific American*, 272(5), 62-6 (1995)], branch cells [see *Dendrimers and Other Dendritic Polymers*, eds. Jean J. Fréchet and Donald A. Tomalia, pub. John Wiley & Sons, Ltd. (2001); "Dendrimers—An Enabling Synthetic Science to Controlled Organic Nanostructures," D. Tomalia, R. Esfand, K. Mardel, S. A. Henderson, G. Holan, Chapter 20 in *Handbook of Nanoscience, Engineering and Technology* (W. A. Goddard III, D. W. Brenner, S. E. Lyshevski, G. J. Irafrate, eds.) CRC Press, Boca Raton, 20.1-20.34 (2002); and M. K. Lothian-Tomalia, et al., *Tetrahedron*, 3(45), 15495-15513 (1997)], or dendrons [see for example M. K. Lothian-Tomalia, et al., Tetrahedron, 53(45), 15495-15513 (1997); and O. A. Matthews, et al., *Prog. Polym. Sci.*, 23, 1-56, 1998] around atomic or molecular cores with adherence to either divergent or convergent dendritic branching principles is now well documented [see for example D. A. Tomalia, et al., *Polym. J. (Tokyo)*, 17, 117-32 (1985); and G. R. Newkome, C. N. Moorfield, F. Vögtle, *Dendritic Molecules*; VCH: Weinheim, 1996] and known to those skilled in this art. [See the general discussions in *Dendrimers and Other Dendritic Polymers*, eds. Jean J. Fréchet and Donald A. Tomalia, pub. John Wiley & Sons, Ltd. (2001), pp. 20-23.]

Convergent synthesis can provide the joining of differentiated dendrons as shown by J. M. J. Fréchet in *J. Org. Chem.*, 69, 46-53 (2004). Such a systematic occupation of nanospace around cores with monomers or branch cells, as a function of generational growth stages (i.e., monomer shells), to give discrete, quantized bundles of mass has been well demonstrated [for example D. A. Tomalia, *Materials Today*, pp. 34-46, March 2005; and G. J. Kallos, et al., *Rapid Commun. Mass Spectrom.*, 5(9), 383-6 (1991)]. A general scheme for the synthesis of cystamine core: poly(amidoamine) dendrimers (e.g., PAMAM dendrimers) is illustrated in Scheme 1 below.

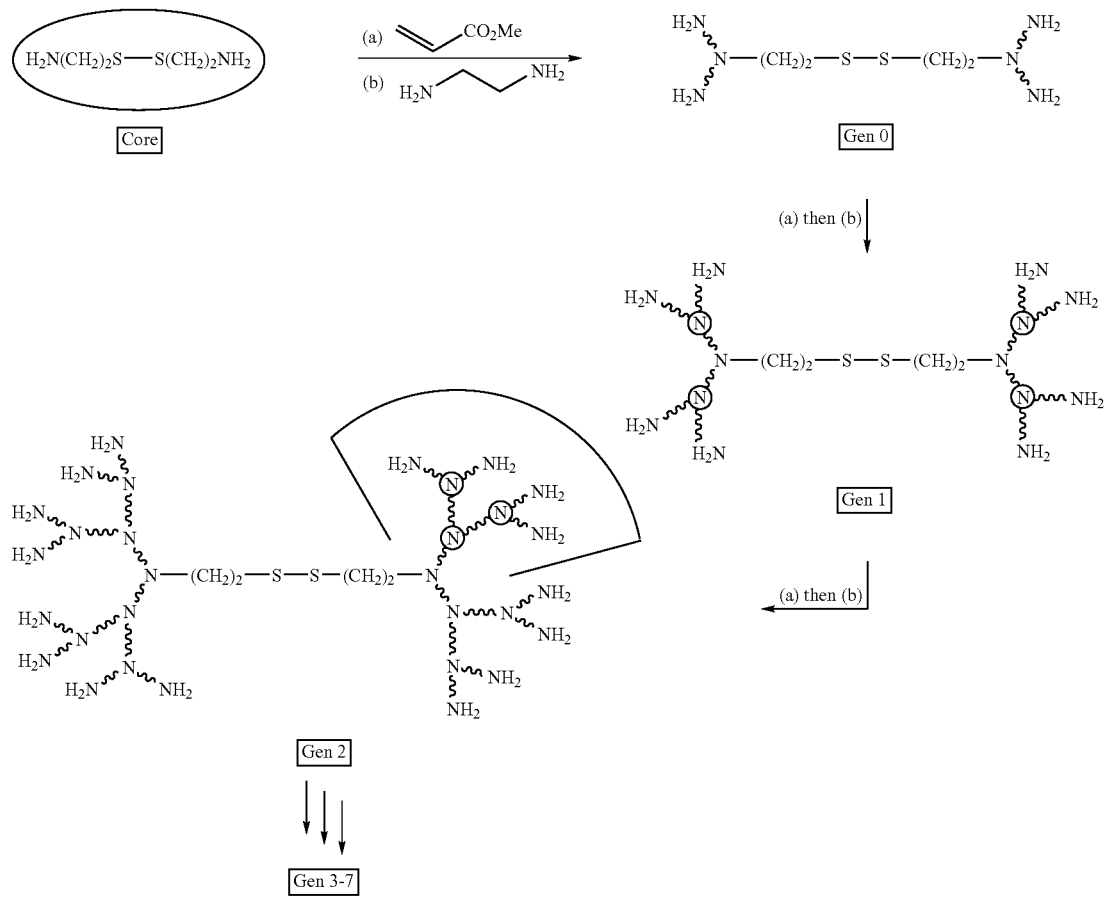

Scheme 1

This Scheme shows divergent synthesis of cystamine-dendri-PAMAM dendrimers utilizing the iterative sequence: (a) alkylation with methyl acrylate, followed by (b) amidation with excess ethylenediamine to produce G=3-7 PAMAM dendrimers possessing disulfide linkage in their cores. [See for example U.S. Pat. No. 6,020,457.]

These parameters have been shown to be mathematically predictable [see for example M. K. Lothian-Tomalia, et al., *Tetrahedron*, 53(45), 15495-15513 (1997); D. A. Tomalia, *Aldrichimica Acta*, 26(4), 91-101 (1993); and D. A. Tomalia, *Advanced Materials*, 6(7/8), 529 (1994)] (see FIG. 2) and are confirmed by mass spectrometry [see G. J. Kallos, et al., *Rapid Commun. Mass Spectrom.*, 5(9), 383-6 (1991); P. R. Dvornic and D. A. Tomalia, *Macromol. Symp.*, 98 (35th IUPAC International Symposium on Macromolecules, 1994) 403-28 (1995); D. A. Tomalia, H. D. Durst; *Topics in Current Chemistry Vol. 165: Supramolecular Chemistry I—Directed Synthesis and Molecular Recognition;* 193-313; E. Weber (editor), Springer-Verlag Berlin Heidelberg (1993); and C. Hummelen, et al. *Chem. Eur. J,* 3, 1489-1493. (1997)], gel electrophoresis [see H. M. Brothers II, et al., *J. of Chromatography A,* 814, 233-246 (1998); and C. Zhang, D. A. Tomalia, Chapter 10 in *Dendrimers and Other Dendritic Polymers*, eds. Jean J. Fréchet and Donald A. Tomalia, pub. John Wiley & Sons, Ltd. (2001),] and other analytical methods [see H. M. Brothers II, et al., *J. of Chromatography A,* 814, 233-246 (1998); C. Zhang, D. A. Tomalia, Chapter 10 in *Dendrimers and Other Dendritic Polymers*, eds. Jean J. Fréchet and Donald A. Tomalia, pub. John Wiley & Sons, Ltd. (2001); and P. L. Dubin, et al., *J. Chromatogr.,* 635(1), 51-60 (1993)]. At present over 100 different compositional dendrimer families with over 1000 different surface modifications have been reported [see D. A. Tomalia, *Materials Today*, pp. 34-46, March 2005].

Access to this level of macromolecular structure control has created substantial interest in the use of dendrimer structures as unimolecular mimics of globular proteins [see for example R. Esfand, D. A. Tomalia, *Drug Discovery Today*, (6) 8, 427-436 (2001); S. Hecht, J. M. J. Fréchet, *Angew. Chem. Int. Ed.,* 40(1), 74-91 (2001); and D. A. Tomalia, et al., *Proc. Nat. Acad. Of Sciences,* 29(8), 5081-5087 (2002)], micelles [see D. A. Tomalia, *Macromol. Symp.,* 101, 243-255 (1996); N. J. Turro, W. Chen, M. F. Ottaviani, In *Dendrimers and Other Dendritic Polymers;* Fréchet, J. M. J., Tomalia, D. A., Eds.; John Wiley & Sons: West Sussex, pp 309-330 (2001); and D. Watkins, et al., *Langmuir,* 13, 3136-3141 (1997)] and a variety of other biological self-assemblies [for example D. A. Tomalia, et al., *Angew. Chem. Int. Ed. Engl.,* 29(2), 138-75, (1990); and J. F. Kukowska-Latallo, et al., *Proc. Natl. Acad. Sci.,* 93, 4897-4902, May (1996)].

Using strictly abiotic methods, it has been widely demonstrated over the past decade that dendrimers can be routinely constructed with control that rivals the structural regulation found in biological systems. Such mimicry and comparison of spherical dendrimers to proteins was made as early as 1990. [For example D. A. Tomalia, et al., *Angew. Chem.*, 102(2), 119-57, (1990); *Angew. Chem. Int. Ed. Engl.*, 29(2), 138-75, (1990).] The close scaling of size [see R. Esfand, D. A. Tomalia, *Drug Discovery Today*, (6) 8, 427-436 (2001)], shape [see D. A. Tomalia, et al., *Proc. Nat. Acad. Of Sciences*, 29(8), 5081-5087 (2002); and D. A. Tomalia, et al., *Tetrahedron*, 59, 3799-3813 (2003)] and quasi-equivalency comparison of dendrimer surfaces [see V. Percec, et al., *J. Am. Chem. Soc.*, 118, 9855-9866 (1996); V. Percec, et al., *Nature*, 391, 161-164 (1998); and S. D. Hudson, et al., *Science*, 278, 449-452 (1997)] to nanoscale biostructures is both striking and provocative (See FIG. 3).

SUMMARY OF THE INVENTION

The present invention relates to a dendrimer that is a Janus dendrimer comprising at least two dissimilar dendrons joined at their cores having a heterobifunctional character. The cores may be joined to form the Janus dendrimer by: (a) a connecting group such as a Crick-Watson base pair of 3 or more base pairs, usually no more than 50 base pairs, preferably not more than 20 base pairs, (b) linking moieties that form between two dendrons, such as a disulfide bond (—S—S— bond), —N—N— bond, —Si—Si— bond, ether linkage, ester linkage, or other suitable organic linkers, such as ethylenediamine, (c) ligation type linkages (e.g., hydrazone formation), and (d) click chemistry type linkages, and the like. More than two dendrons may be joined by the selection of a linker, such as an ethylenediamine linker, to attach to each dendron core such that more than two dendrons could be joined, for example when ethylenediamine is the linker, four dendrons could be joined. Preferably there are two dendrons joined. Also included in this invention is a process for making the Janus dendrimer wherein the core is reacted by a Crick-Watson base pair after each dendron is formed. The dendron portions of the Janus dendrimer must have at least two different or dissimilar dendrons present. Thus at least two of the dendrons present in the Janus dendrimer must not be identical.

The dendrons are selected from dendritic polymers such as PAMAM dendrimers, PEHAM dendrimers, polylysine dendrimers, dendrigraft dendrimers, random hyperbranched dendrimers, hyperbranched dendrimers, and other dendritic polymers. Preferably at least one of the dendrons in the Janus dendrimer is a PEHAM dendrimer. The dendrons forming the Janus dendrimer are made as separate dendrons having the dendritic repeating units desired and a core where the core has a reactive functionality to join with other dendron core(s) or a connecting group (i.e., a group that joins the dendrons at their core) or other reactive moiety (such as a group capable of binding to a protein, antibody, drug, pro-drug, biologically active moiety, or other desired entity, including but not limited to combined targeting and signaling agents; specific targeting entities for diagnostic and therapeutic applications, such as for example, targeted MRI, targeted near infrared (IR) signaling agents, targeted radionuclide delivery for diseases such as cancer, and targeted photosensitive or radiowave sensitive agents. If another reactive moiety is present connected to the core of a dendron, then a Janus dendron is formed that may have as few as one dendron present and the reactive moiety joined to that dendron core. These dendrons may be combined to form Janus dendrimers where each dendron is selected to provide the bifunctional properties desired in the final Janus dendrimer. These prepared dendrons may be combined to form the Janus dendrimers as desired to obtain the functionality needed for use as: a combinatorial libraries of bifunctional structures; combined target director and signaling dendrimers; or specific targeting entities for diagnostic and therapeutic applications.

Another way to understand this feature of N-SIS is by using SER that reflects on the steric space surrounding a reactive site that is required for reactivity at that site and may exclude certain reagents from that reaction site based on steric size.

Figure 10A:
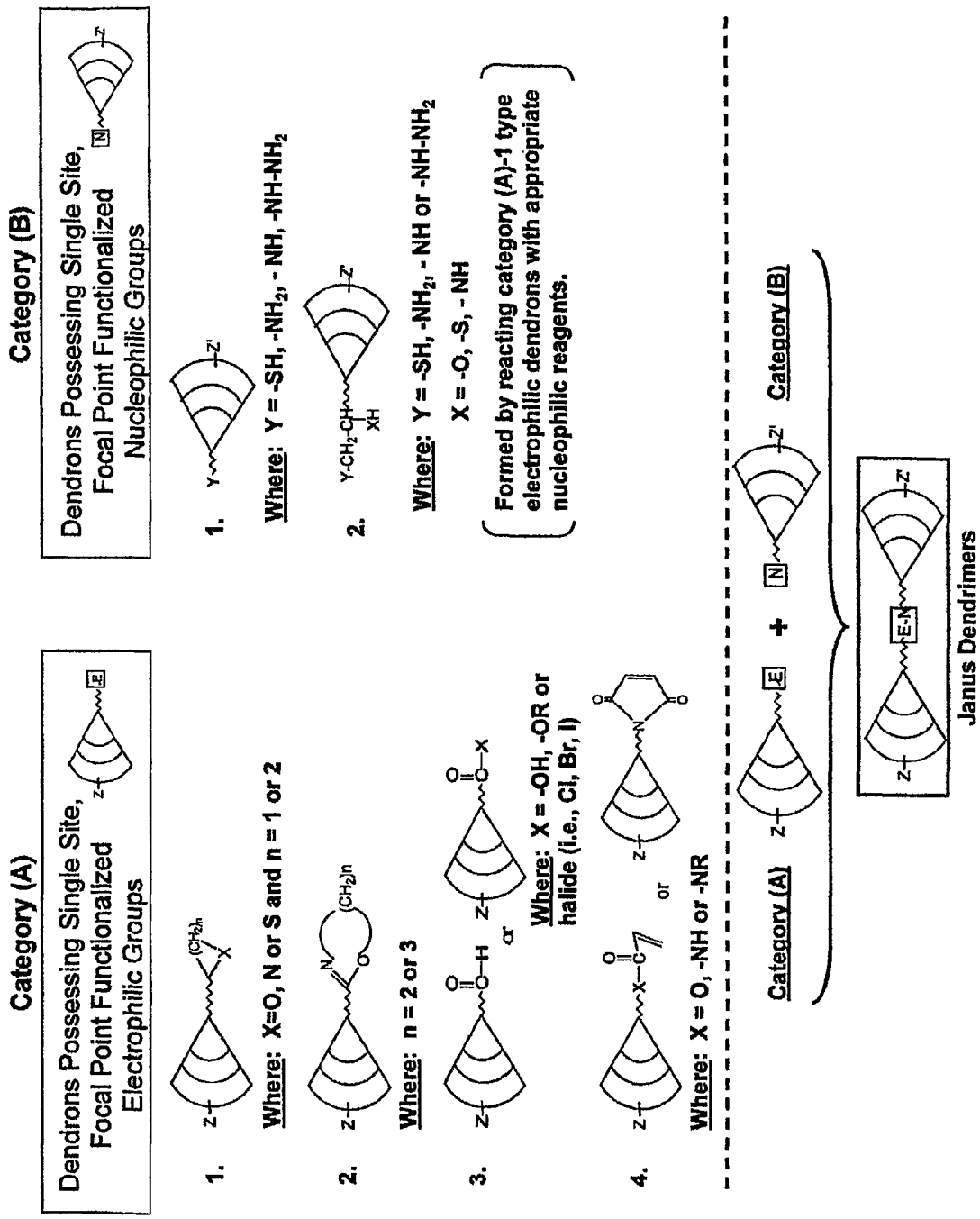
Figure 10B:
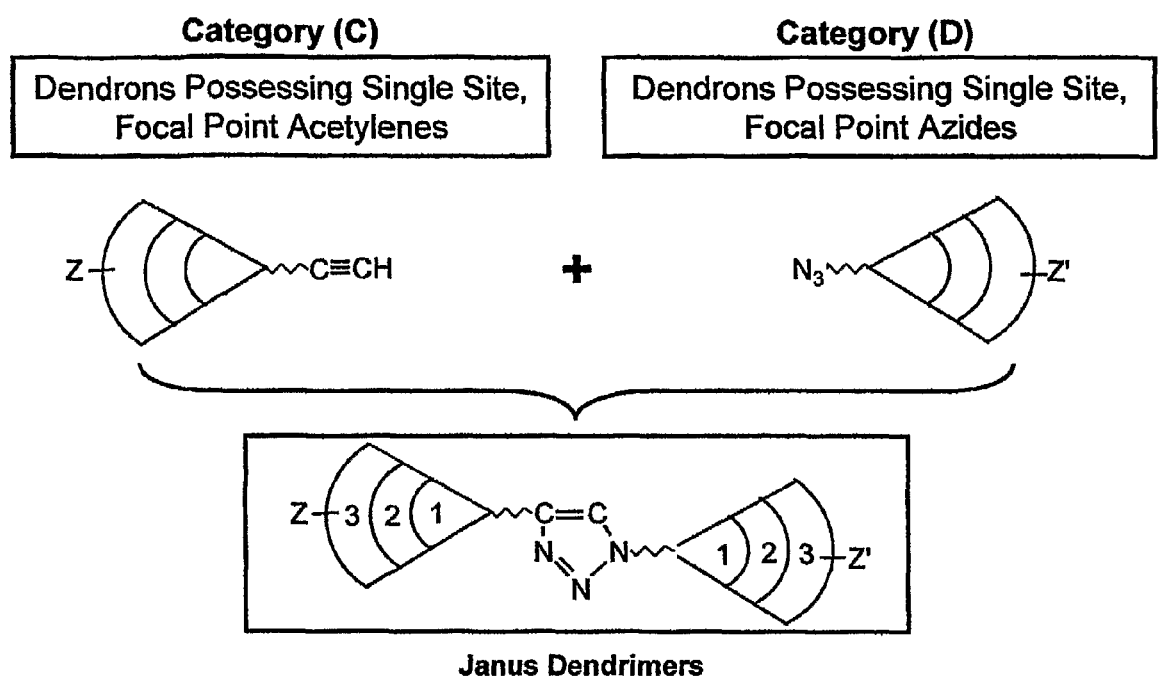

FIG. 10 illustrates a general process for preparing these Janus dendrimers using, in FIG. 10A, Category (A) electrophilic focal point dendrons with Category (B) nucleophilic focal point dendrons, which each are dendrons of this invention, and which may then be reacted together to form the Janus dendrimer of this invention, and, in FIG. 10B, Category (C) acetylene focal point dendrons with Category (D) azide focal point dendrons, which each are dendrons of this invention, and which may then be reacted together to form the Janus dendrimer of this invention. Each of these dendrons may be dendrimers of any of the dendritic polymers described in this specification.

DETAILED DESCRIPTION OF THE INVENTION

For the purposes of this application and the following discussion, the following terms are defined as provided below, where the singular appears it also may include the plural:

"AIBN" means 2,2'-azobis(isobutylnitrile).

"Behera's reagent" means a two-step construction of an aminotriester monomer as described in G. R. Newkome, C. N. Moorfield, F. Vögtle, *Dendritic Molecules*; VCH: Weinheim, pg 148, (1996).

Figure 9:
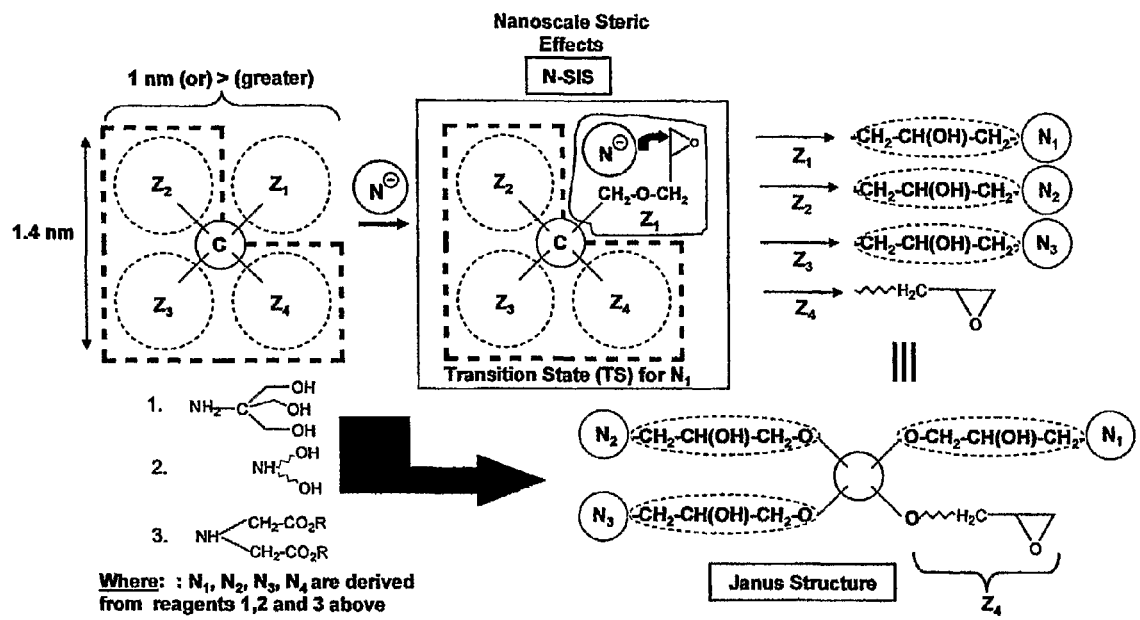
FIG. 9 illustrates the theory of the N-SIS reactions for forming some of the dendrons that can be used in making the Janus dendrimers. For use of this figure the next steps should be followed,
1. First define the "tether point", which in this case is [C].
2. Determine nanometer space around reaction site, (transition state in yellow) in cubic nm defined by attachments $Z_2$, $Z_3$, and $Z_4$ to the "tether point" [C].
3. Is the sum of the reactant plus substrate volume involved in required transition state (TS) larger than the TS required for each reaction (i.e., $Z_1$, $Z_2$, $Z_3$, $Z_4$)? If it is larger, then attempting to perform that step places it in a "forbidden steric state" and the reaction will not occur, thus producing an N-SIS effect). For example, the summation of steric volumes $N_1$, $N_2$, $N_3$ compress available space left for $Z_4$ to a point that reaction $N_4$ is forbidden and the Janus structure shown is the dominant product.

"Connecting group" means any group that can serve to join two or more cores; including but not limited to a Crick-Watson base pair of 3 or more base pairs, linking moieties that form between two dendrons, such as a disulfide bond (—S—S— bond), —N—N-bond, —Si—Si— bond, ether linkage, ester linkage, or other suitable organic linkers, such as ethylenediamine, [PETGE, Epon 1031, etc. (all the polyfunctional epoxys—see FIG. 9)] and the like.

"Core" means the focal point of the dendritic polymer from which the dendritic branching emanates. The core may be used in convergent or divergent synthesis of the dendrons that then are joined at their cores or through a connecting group to form a Janus dendrimer.

"DCM" means dichloromethane.

"Dendrigraft polymer" means a linear polymer is the core where grafted dendritic branches are attached and such branches may be further reacted to any generation or surface functionality.

"Dendritic polymer" means any dendritic molecule such as a dendron or dendrimer, e.g., PAMAM dendrimers, PEHAM dendrimers, polylysine dendrimers, PPI dendrimers, dendrigraft polymers, and random hyperbranched polymers.

"Dendron" means a dendritic polymer where at least one reactive site is available on the core to join with a connecting group, a reactive moiety, or another core. Thus a Janus dendron has the features of both a dendron having at least one reactive site on the core (e.g., a RFM Dendron) and a Janus dendrimer having heterobifunctional character. Also included within this invention are intermediates for a Janus dendrimer comprising at least one N-SIS dendron having at least one reactive group from its core or from its connecting group present capable of further reaction to form a Janus dendrimer or other reactive moiety.

"DMI" means dimethyl itaconate.

"DTPA" means diethylenetriaminepentaacetic acid.

"DTT" means dithiothreitol.

"EDA" means ethylenediamine.

"EPC" means ethyl-1-piperizine carboxylate.

"EPON-1031" means epichlorohydrin/tetraphenylol ethane epoxy resin.

"FF" means focal point functionality at the core of a dendron or such a functionality attached by a connecting group to the core of a dendron.

"HS-R" means sulfhydryl dendron.

"Janus dendrimer" means the joining of two or more dendrons where at least two of the dendrons possess different interior or terminal compositions or chemical functionality so that they manifest heterofunctionality. The core on the Janus dendrimer may be either fully filled with dendrons (i.e., fully reacted core moieties with dendrons) or may have one or more reactive functional moieties (RFM) present provided that it also has two or more dendrons where at least two of the dendrons possess different interior or terminal compositions or chemical functionality so that they manifest heterofunctionality. A preferred Janus dendrimer contains at least one PEHAM dendron.

"N-SIS" means "nanoscale sterically induced stoichiometry". See FIG. 9. While not wishing to be bound by theory, the ability to form the desired dendrons to use in this Janus dendrimer may be formed in the following manner. Determine the nanometer space around reaction attached at the core [C] defined as the "tether point", (transition state (TS) shown in yellow in the Figure) in cubic nm defined by attachments $Z_2$, $Z_3$, and $Z_4$ to of the core [C]. Is the sum of the reactant plus substrate volume involved in the required TS larger than the TS required for each reaction (i.e., $Z_1$, $Z_2$, $Z_3$, $Z_4$)? If it is larger, then attempting to perform that reaction step places it in a "forbidden steric state" and the reaction will not occur, thus producing an N-SIS effect. For example, the summation of steric volumes $N_1$, $N_2$, $N_3$ compress available space left for $Z_4$ to a point that reaction $N_4$ is forbidden and the Janus dendron structure shown is the dominant product. When a smaller reactant is used that can "fit into the available steric volume" then the reaction will proceed. Thus the use of smaller connecting groups enables the Janus dendrimer to form when the steric considerations of these groups is a factor in the reaction proceeding.

"MALDI-TOF" means matrix-assisted laser desorption ionization time of flight mass spectroscopy.

"MIBEP" means methisobutyliminoethylpiperazine.

"MIPEP" means methylisopropyliminoethylpiperazine.

"MRI" means magnetic resonance imaging using conventional methods.

"PAMAM dendrimer" means any poly(amidoamine) dendrimer of any generation, core or surface functionality.

"PEHAM dendrimer" means poly(etherhydroxylamine) dendrimer, which has at least one extender or interior functionality present, of any generation, core or surface functionality, or hybridized combination of PAMAMs with PEHAMs or PPIs. Interior functionality is created by the ring opening reaction of small/medium ring functionality (i.e., 2-6 member rings such as a double bond, triple bond, epoxy, aziridine, thiorane, azetidines, β-lactam, oxetane, oxazolines, and keto-oxazolines, oxazines, and keto-oxazines) or Michael's addition to a polyacrylate functionality of the branch cell reagents. This nucleophilic addition occurs during the dendritic growth generated from one generation to the next generation which results in the formation of interior reactive sites (such as hydroxyl, sulfhydryl, amine, alkylsilane, silane, boranes, carboxy, or amide moieties). These resulting interior functionalities may be further reacted and serve as attachment sites for chelation or covalent encapsulation. Extenders are present in the interior of the dendrimer and are groups which lengthen the distance between generations (increasing space in a generation where they are present). Such extenders are lysine, poly(amino acids) such a polylysine, linear PEI, poly(N-aryl/aryl)polyethyleneimine oligoethyleneglycols, diethylenetetraamine and higher amine analogs, fatty acids with di- or greater heterogeneous or homogeneous functionality, unsaturated aliphatic and aromatic difunctional or polyfunctional moieties and heterogeneous unsaturated aliphatic and aromatic difunctional or polyfunctional moieties; preferred are diaminoalkanes, diphenols, dithiophenols, aromatic poly (carboxylic acids), mercaptoamines, mercaptoethanol, allylamines, piperazine, amino ethyl piperazine, ethyl-N-piperazine carboxylate, allyl glycidyl ethers, ethylenediamine, diethylaminodiacetate, pentaethylenehexamine, aza[2.2.2]cryptand, and branched dendritic polymers such as polylysine, linear PEI.

"PEI" means polyethyleneimine.

"PETGE" means pentaerythritol tetraglycidyl ether.

"Polylysine" means an asymmetrical dendrimer made from lysine of any generation and surface functionality.

"PI" means polypropyleneimine.

"Random hyperbranched polymer" means a random polymerization of $AB_x$ monomers where x=2 or more, where A from one monomer reacts with B from another monomer (e.g., poly(amidoamines), poly(ethers), poly(ether hydroxylamines), poly(phenylenes), poly(phenylacetylenes), polycarbosilanes, polycarbosiloxanes, polysiloxysilanes, poly (ether ketones), and polyesters).

"RB" means a round bottom flask.

"RFM" means a dendron that has a reactive focal moiety at it focal point functionality (FF).

"RT" means room temperature, about 20-25° C.

"SER" means "size exclusion reactivity" and reflects on the steric space surrounding a reactive site that is required for reactivity at that site and may exclude certain reagents from that reaction site based on steric size. This is another way to understand N-SIS. See FIG. 9.

"TLC" means thin layer chromatography; using toluene and acetone (7:3 v/v) with spots visualized from $KMnO_4$ stain.

The general reaction schemes to prepare Janus dendrimers and dendrons are provided below.

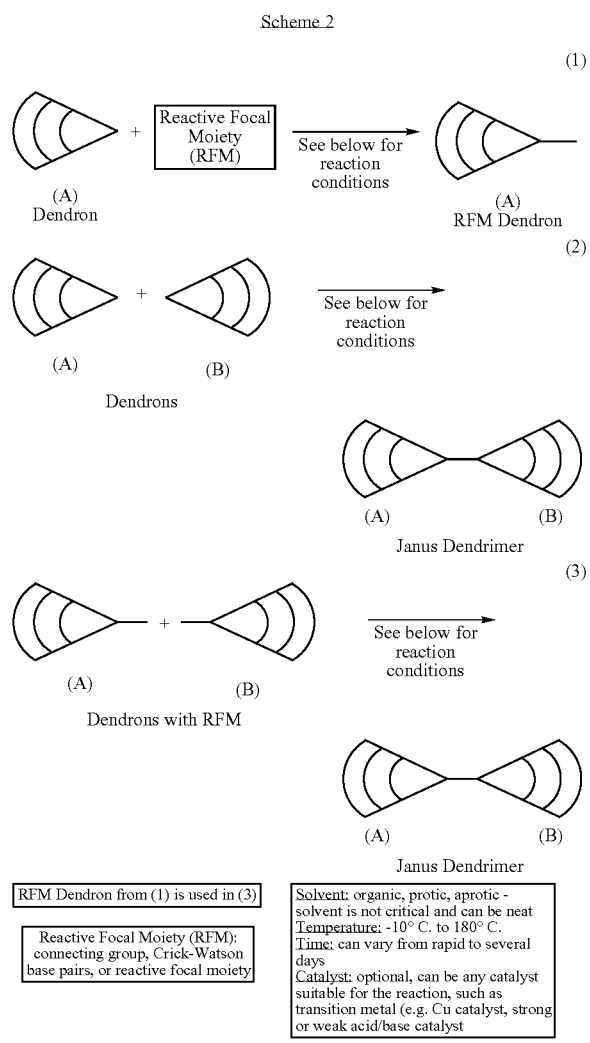

Scheme 2

Figure 1:
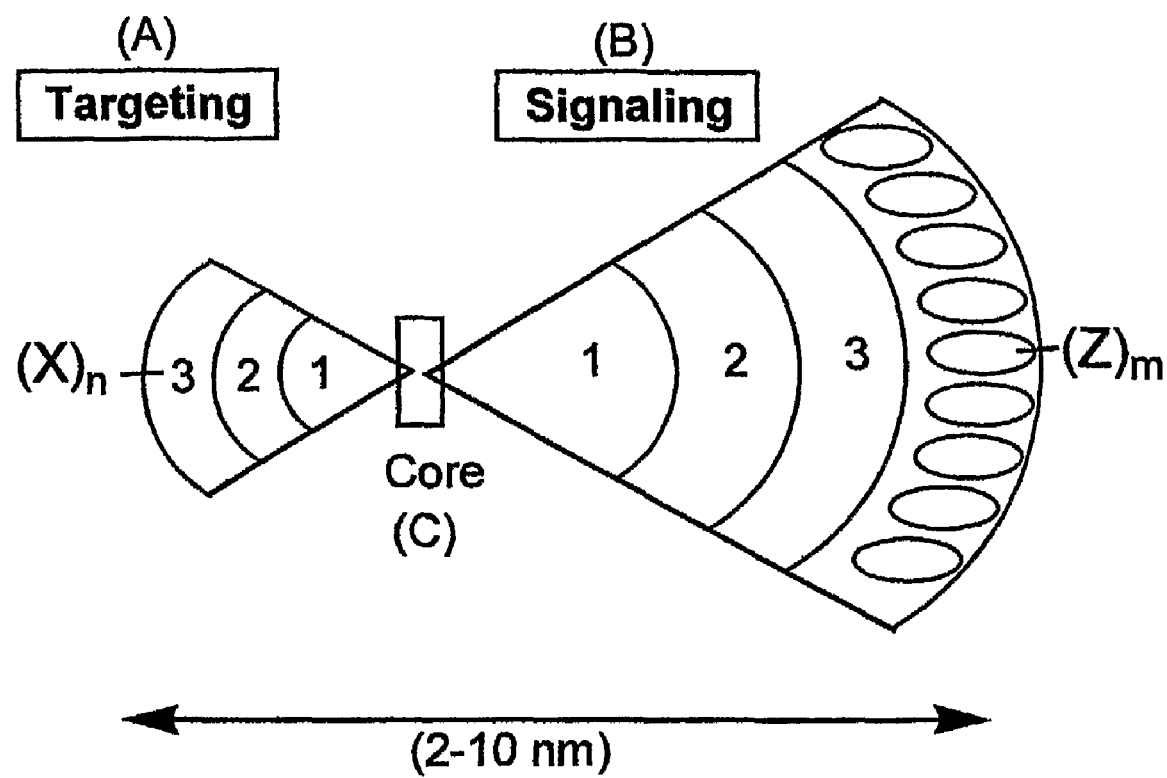
FIG. 1 illustrates a Janus dendrimer based targetable, MRI contrast agent, as one aspect of these present Janus dendrimers.
Figure 2:
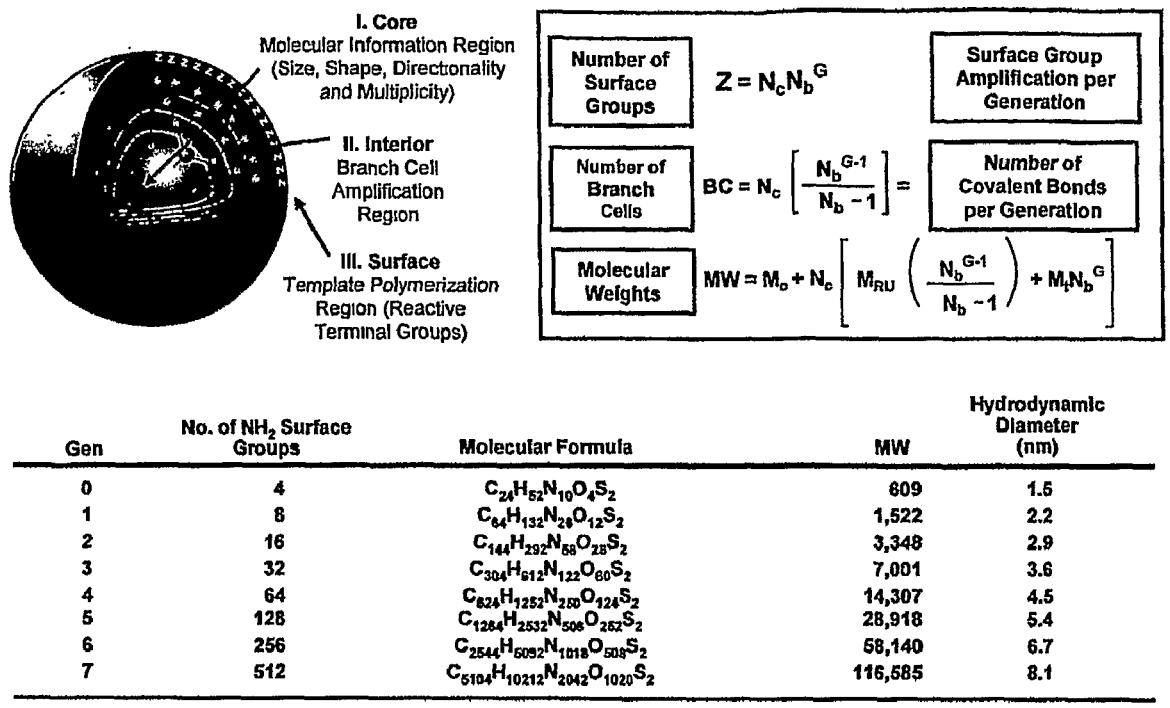
FIG. 2 illustrates the mathematical expression for calculating the theoretical number of surface groups (Z), branch cells (BC) and molecular weights (MW) for cystamine core PAMAM dendrimers as a function of generation (G). Approximate hydrodynamic (G=0-7) values are provided based on gel electrophoretic comparison with the corresponding ethylenediamine core PAMAM dendrimers.
Figure 3:
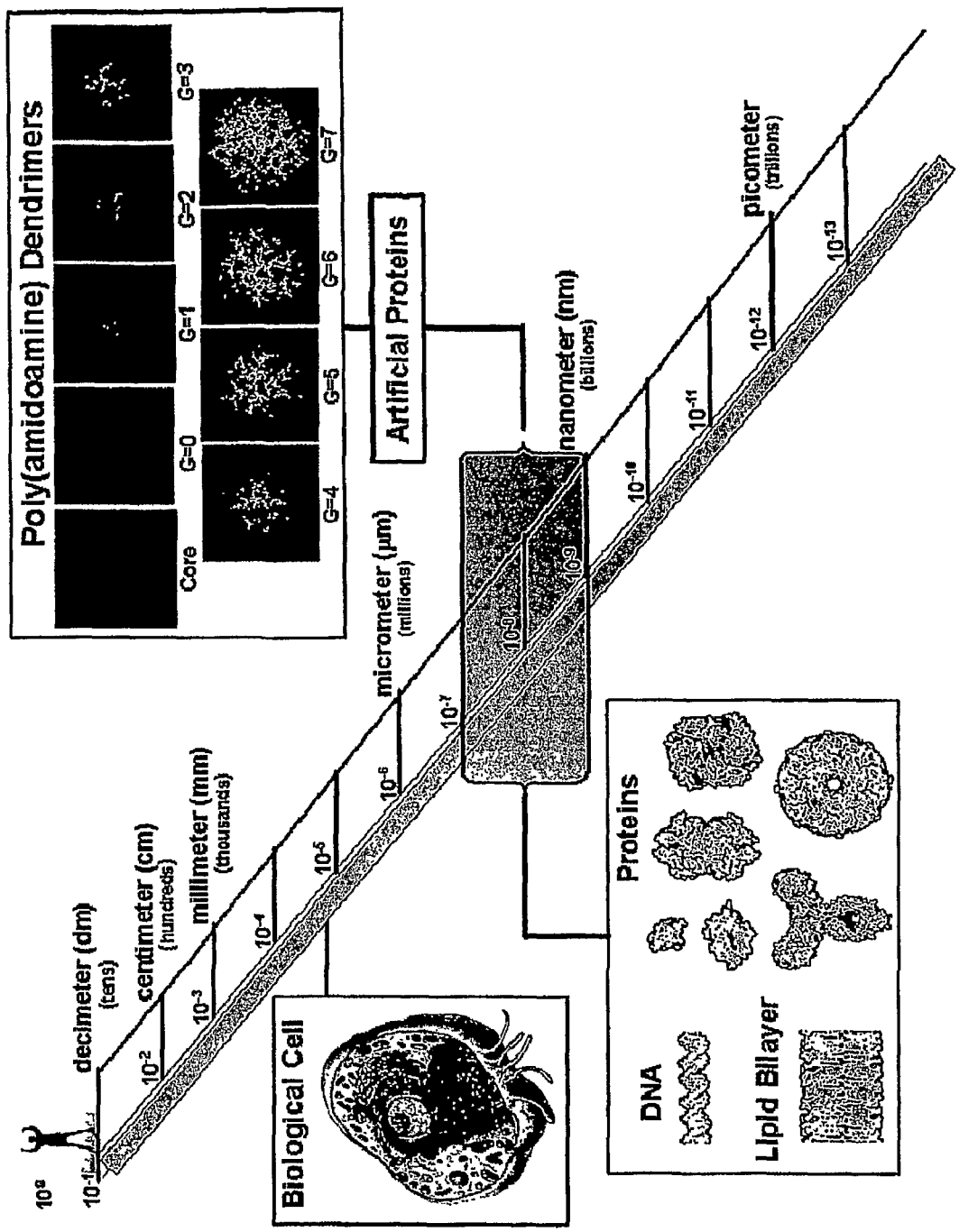
FIG. 3 illustrates a comparison of micron-scale biological cells to nanoscale proteins and PAMAM dendrimers.

To prepare a cost effective Janus dendrimer is accomplished by various processes as shown generally above in Scheme 2. One such process is to use a focal point specific ligation chemistry where the core of a dendrimer is the ligation site and the differentiated dendrons are the heterobifunctional moieties. FIG. 1 illustrates this approach wherein the core is C, the various generations are numbered, the surface groups are differentiated; wherein, —X is targeting and Z is signaling. The joining of (A) and (B) to form (C) involves ligation methods well known in protein conjugation chemistry. These methods afford a non-amide bond such as an oxime, hydrazone or thiazolidine linkage. The dendrons by this process are coupled together to form a di-dendron using the method described by James P. Tam et al. in *J. Am. Chem. Soc.* 123, 2487-2494 (2001). Especially desired are those Janus dendrons and Janus dendrimers wherein at least one dendron is a PEHAM dendron.

Another process is dendritic amplification from a differentiated core (C) using either orthogonal/and or protection chemistry to construct a domain (A) for attachment of biological targeting groups and similarly construct dendritic domain (B) for attachment and amplification of signaling groups. This scaffolding originates from a differentiated core (C) that allows the use of differentiated orthogonal chemistry to produce suitable dendritic amplification $(X)_n$ for presentation of biological targeting groups in domain (A) and appropriate dendritic amplification $(Z)_m$ to allow a desired signal amplification in the domain (B) of the Janus dendrimer. Thus the two dendrons are joined at the core after each of the dendrons is synthesized. The two dendrons when joined constitute a di-dendron type Janus dendrimer molecule.

More specifically, the two differentiated dendrons may be joined together according to the nature of the single site focal point functionalized groups on the respective dendrons as described in FIGS. 10A and 10B. For example, Category A type dendrons possessing electrophilic focal point groups may be combined with Category B type dendrons possessing nucleophilic focal point groups to produce Janus type dendrimers as illustrated in FIG. 10A.

FIG. 10A illustrates two categories of dendrons possessing either category (A) single site, focal point electrophilic functional groups [E] or category (B) single site, focal point nucleophilic functional groups [N]. In each case, these dendrons possess terminal surface functional groups, Z and Z' respectively which exhibit orthogonal reactivity relative to [E] or [N]. Chemically reacting category (A) with category (B) type dendrons produces the desired Janus dendrimer.

Furthermore, as illustrated in FIG. 10B, Category C type dendrons possessing single site focal point acetylenes may be combined with Category D type dendrons possessing single site, focal point azides may be used to produce Janus type dendrimers by forming 1,2,3-triazole linkages between the two differentiated dendron focal points as shown in FIG. 10B.

FIG. 10B illustrates two categories of dendrons possessing either Category (C) single site, focal point acetylene functional groups or Category (D) single site, focal point azide functional groups. In each case, these dendrons (C) and (D) possess terminal surface functional group Z and Z', respectively, which exhibit orthogonal reactivity relative to focal point functionality on dendrons (C) and (D). Chemically reacting the Category (C) dendrons with Category (D) type dendrons in the presence of appropriate metal catalysts (i.e., copper metal or its salts) produces the desired Janus dendrimer by involving a 1,3-dipolar cyclo-addition (Huisgen type) reaction to produce a 1,2,3-triazole linkage [see for example Sharpless, et al. *Angew Chem. Int. Ed.* 40, 2004 (2001)].

With either process to make a Janus dendrimer, the domain (A) of FIG. 1 will possess suitable orthogonal/protected chemical functionality to allow attachment of two or more receptor mediated targeting groups. Domain (B) of FIG. 1 of the Janus dendrimer will possess suitable amplified dendritic scaffolding/functional groups that will allow covalent attachment of high multiplicities of signaling moieties [such as a paramagnetic metal (gadolinium) chelation groups (i.e. 24-96 ligands)], near-infrared (NIR) type signaling groups (S. A. Helderbrand, et al., *Bioconjugate Chem.*, L6, 1275-1281 (2005), quantum dots (QDs), radioisotopes, etc. and/or appropriate target directing groups (i.e. VEGF, GMF, α,β-integrins, hyaluronic acid, polyunsaturated fatty acids, cyclic polypeptide-angiogenesis, folic acid—KB cells, antibodies or antibody fragments) will be selected for targeting cancer driven angiogenesis or specific over expressed receptor sites found on a variety of primary or metastasized cancer cell targets, and/or target directors will be attached to the dendritic scaffolding with appropriate spacers to allow robust, receptor mediated interactions. As an illustration, the site specific MRI targeting behavior of selected cancer cells will be demonstrated in vivo on suitable animal models. [See J. F. Kukowska-Lattallo, et al., *Cancer Res.* 65(12) 5317-5324 (2005).]

These remarkable similarities suggest a broad strategy based on rational biomimicry for creating a repertoire of structure-controlled, size and shape-variable dendrimer assemblies [see for example D. A. Tomalia, et al., *Proc. Nat. Acad. Of Sciences*, 99(8), 5081-5087 (2002); and D. A. Tomalia, et al., *Tetrahedron*, 59, 3799-3813 (2003)]. Successful demonstration of critical covalent chemistry to practice such a biomimetic approach has provided a versatile and powerful synthetic strategy for systematically accessing virtually any desired combination of size, shape or surface chemistry in the nanoscale region. This is possible by combinatorial variation of critical dendritic module parameters such as: (i) interior compositions, (ii) surfaces, (iii) generational levels, or (iv) architectural shapes (i.e., cone-like, spheroidal, ellipsoidal, rod-like, etc.). Substantial progress in this area has been focused on divergent synthesis strategies to produce disulfide core PAMAM dendrimers. Specifically, reduction of the disulfide function, found in cystamine core dendrimers, to produce single-site, thiol functionalized (PAMAM) di-dendrons [see D. A. Tomalia, et al., *Tetrahedron*, 59, 3799-3813 (2003); and C. R. DeMattei, et al., *NanoLetters*, 4(5), 771-777 (2004)]. Combinatorial hybridization of these single-site, sulfhydryl dendron components and re-oxidation, provides a versatile strategy for systematic shape designing and chemo-differentiation of the resulting dendrimer surfaces.

The exquisite control of size, shape and surface chemistry that is possible with dendrimers and their non-immunogenetic properties have already led to their use as replacements for proteins in a variety of applications. These uses include gene delivery [for example J. D. Eichman, A. U. Bielinska, J. F. Kukowska-Lattallo, B. W. Donovan, J. R. Baker Jr., In *Dendrimers and Other Dendritic Polymers*, eds. Jean J. Fréchet and Donald A. Tomalia, pub. John Wiley & Sons, Ltd. (2001), pp 441-461] and, molecular weight calibration [see P. L. Dubin, et al., *J. Chromatogr.*, 635(1), 51-60 (1993); and H.-F. Chow, et al., *Tetrahedron* 59, 3815-3820 (2003))], and presentation of antigens [see J. P. Tam, Y.-A. Lu, *Proc. Nat. Acad. Sci. USA* 85, 9084-9088 (1989)], enzyme mimics [see L. Liu, R. Breslow, R. *J. Am. Chem. Soc.* 12, 12110-12111 (2003)], and site isolation [see S. Hecht, J. M. J. Fréchet, *Angew. Chem. Int. Ed*, 40(1), 74-91 (2001)].

The Janus dendrimers may have the component dendrons selected from the same dendritic polymer class (e.g., a PAMAM dendron with a dissimilar PAMAM dendron such as in generation, surface groups or the like) or different polymer classes (e.g., PAMAM dendron with a PEHAM dendron). The successful design and synthesis of at least two major types of Janus dendrimers has been shown in this application and the other combinations would be done in a similar manner using the methods known to prepare each dendritic polymer class of dendron. The first type involves PAMAM dendrimers possessing a disulfide function (cystamine) in its core. Traditional redox-chemistry associated with the disulfide core in these dendrimer structures provides a versatile strategy for designing unique sizes and shapes and controlling the regio-disposition of chemical groups on the surface of these dendrimers. Various single site, sulfhydryl functionalized dendron reactants were generated in situ, under standard reducing conditions [i.e., dithiothreitol (DTT)]. Facile control of size, shape and chemical functionality placement involved covalent hybridization of these single point, sulfhydryl reactive dendron components. This is accomplished by re-oxidation in the presence of air, to yield generation/surface chemistry differentiated cross-over products which may be isolated by preparative thin layer or column chromatography. Differentiated cystamine core dendrimers derived from combination and permutation of lower generation (i.e. Gen.=0-3) sulfhydryl functionalized dendrons possessing amino, hydroxyl, acetamido or dansyl surface groups were synthesized and isolated as described in FIG. 4.

Figure 5:
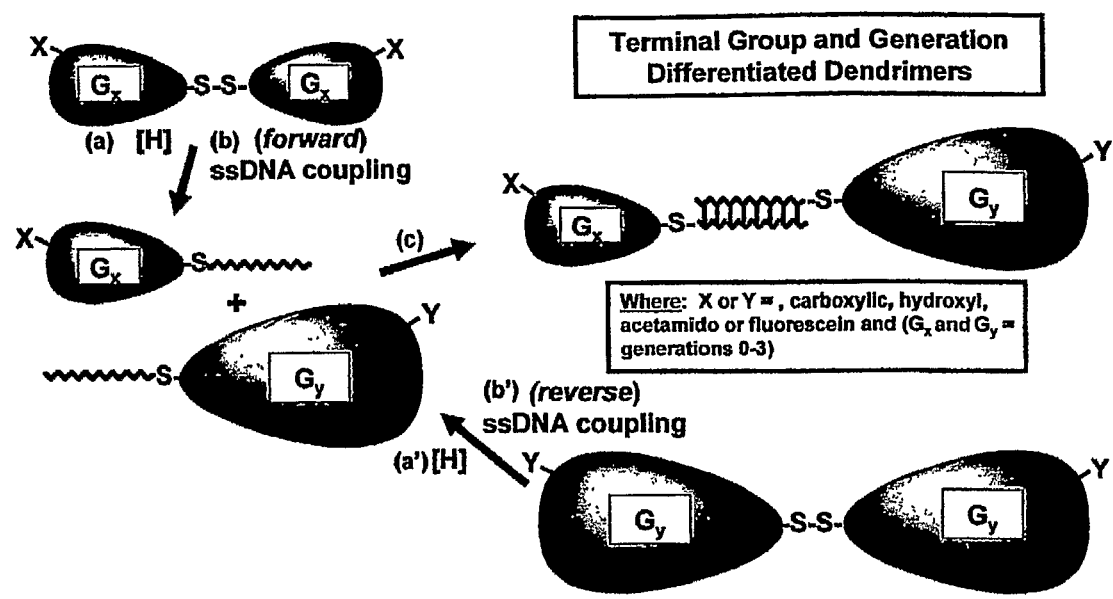
FIG. 5 illustrates Janus dendrimers with Crick-Watson base paired cores.

The second class of Janus dendrimers were produced by combining single site, functionalized, single stranded (ss-DNA) dendri-poly(amidoamine) (i.e., PAMAM) di-dendrons. They were synthesized by covalently conjugating complementary 32 base pair oligonucleotides to single-site, thiol functionalized dendri-PAMAM di-dendrons possessing neutral or anionic surface groups. Combining these complementary (ss-DNA) functionalized PAMAM di-dendrons at appropriate assembly temperatures produced Crick-Watson base paired (dsDNA) cores, surrounded by four PAMAM dendrons. These novel core-shell nanostructures represent a new class of precise monodispersed, linear-dendritic architectural copolymers. Using gel electrophoresis, it was demonstrated that these self-assembled (di-dendron) dendrimers could be hemispherically differentiated as a function of surface chemistry as well as generational size. This new supra-macromolecular approach offers a very facile and versatile strategy for the combinatorial design of size, shape and surface substituents for both homogeneous and differentiated Janus-type dendritic nanostructures (See FIG. 5).

Other areas where these Janus dendrimers can be used with success are in the MRI area. The use of dendrimer based nano-scaffolding for the presentation of high multiplicities of gadolinium was first reported approximately 12 years ago by P. Lauterbur, E. Wiener, M. Brechbiel, D. A. Tomalia, et al. [see E. C. Wiener, et al., *Magnetic Resonance in Medicine*, 1994, 31(1) 1-8 (1994)].

This pioneering work by the Prof. P. Lauterbur literally initiated the field of dendrimer-based "macromolecular MRI contrast agents". During the past decade the development of macromolecular imaging agents has become a burgeoning area of research [see H. Kobayashi, M. W. Brechbiel, *Molecular Imaging*, 2(1) 1-10 (2003); and P. Caravan, et al., *Chem. Rev.*, 99, 2293-2352 (1999)] and commercial development [see Krause, et. al., *Dendrimers in Diagnostics—Topics in Current Chem.* Vol. 210, Springer-Verlag, Berlin-Heidelberg, 261-308 (2000)].

The development of macromolecular imaging agents is a growing field of research and commercial development. This intense interest in macromolecular MRI contrast agents has been driven by shortcomings in the performance of well known low molecular weight (small) agents (i.e. Magnevist®, Omniscan®t, DOTA-$Gd^{+3}$ etc.), which are uniformly limited in their applications by their rapid clearance properties and relatively low molar relaxivities (i.e. 4-6 vs. 30-50) which provide limited sensitivity despite the high level of resolution that can be obtained by this imaging modality. Less than milli-molar concentrations of Gd(III) provide adequate contrast enhancement as a small molecule MRI contrast agent compared to 1% iodine concentrations which are required when using small molecule reagents as CT contrast agents. Making a similar comparison between small molecule versus macromolecular (i.e., dendrimer based) MRI contrast agents reveals that approximately 100 fold less dendrimer based MRI agent is required for a therapeutic dosage due to their vastly enhanced relaxivity properties. This of course offers substantially better therapeutic indices when comparing the two classes of MRI agents. (See Table 1 below.)

TABLE 1

Dendrimer Based MRI Contrast Agents
Exhibiting Outstanding Toxicity Profiles Compares to Clinically Approved Agents*

| Agent | Animal | LD50 (mmole kg) | Effective dose (ED) (mmole kg) | LD50/ED | Ref. |
|---|---|---|---|---|---|
| (NMG)2-Gd-DTPA | Mouse | 8.2 | 0.1 | 82 | Tweedle 17 |
| Gd-DTPA-BMA | Mouse | 34.4 | 0.1 | 344 | Van Wagoner 153 |
| NMG-Gd-DOTA | Mouse | 11.2 | 0.1 | 112 | Meyer 93 |
| Gd(III)-DO3A | Mouse | 7 | 0.1 | 70 | |
| Gd-HP-DO3A | Mouse | 12.0 | 0.1 | 120 | |
| Dendrimer cascade 24 | Mouse | 30 | 0.025 | 1200 | Adam 136 |
| Dendrimer gadomer 17 | Mouse | 30-34 | 0.025 | 1200 | Radüchel 152 |

*From Wiener EC and Narayanan VV "Magnetic Resonance Imaging Contrast Agents: Theory and the Role of Dendrimers." Advances in Dendritic Macromolecules 5, 129-247 (2002).

Several other important aspects of macromolecular MRI contrast agents provide an impetus for their development. The body differentially processes and handles molecules differing by as little as a single nanometer in diameter. Therefore, considerable inherent advantages reside in the use of nano-sized macromolecules.

TABLE II

Macromolecular MRI Contrast Agents Based on PAMAM Dendrimer.*

| Generation | Core | MW (kDa) | Gd Atoms | Size (nm) | Excretion |
|---|---|---|---|---|---|
| G10 | EDA | 3820 | 4096 | 14 | Liver |
| G9 | EDA | 1910 | 2048 | 12 | Liver |
| G8 | EDA | 954 | 1024 | 11 | Liver |
| G7 | EDA | 470 | 512 | 9 | Liver |
| G6E | EDA | 238 | 256 | 8 | Mostly liver |
| G6A | Ammonia | 175 | 192 | 8 | Liver and kidney |
| G5 | Ammonia | 88 | 96 | 7 | Mostly kidney |
| G4 | EDA | 59 | 64 | 6 | Kidney |
| G3 | EDA | 29 | 32 | 5 | Kidney |
| G2 | EDA | 15 | 16 | 4 | Kidney |
| DTPA | n/a | 0.8 | 1 | >1 | Kidney |

*From H. Kobayashi and M. W. Brechbiel "Dendrimer-based Macromolecular MRI Contrast Agents: Characteristics and Application, Molecular Imaging, 2(1), 1-10 (2003).

The use of increased size and weight to alter pharmacokinetics and dynamics to retain the contrast agents for longer periods of time and to also actively target their use to some extent is desired and can be obtained by these Janus dendrimers. This has led to some advancements in the area of non-covalently bound Gd(III) complexes that interact reversibly with serum proteins (albumin) to modulate clearance rates and to also take advantage of a molar relaxivity enhancement of their sensitivity when bound to the protein [see R. B. Lauffer, et al., Radiology, 207, 529-538 (1998); and M. Botta, et al., Org. Biolmol. Chem., 2, 570-577 (2004)]. The covalently assembled Janus dendrimer macromolecules, more specifically dendrimer based nano-scaffolding, is highly desired and useful for this purpose.

Figure 6:
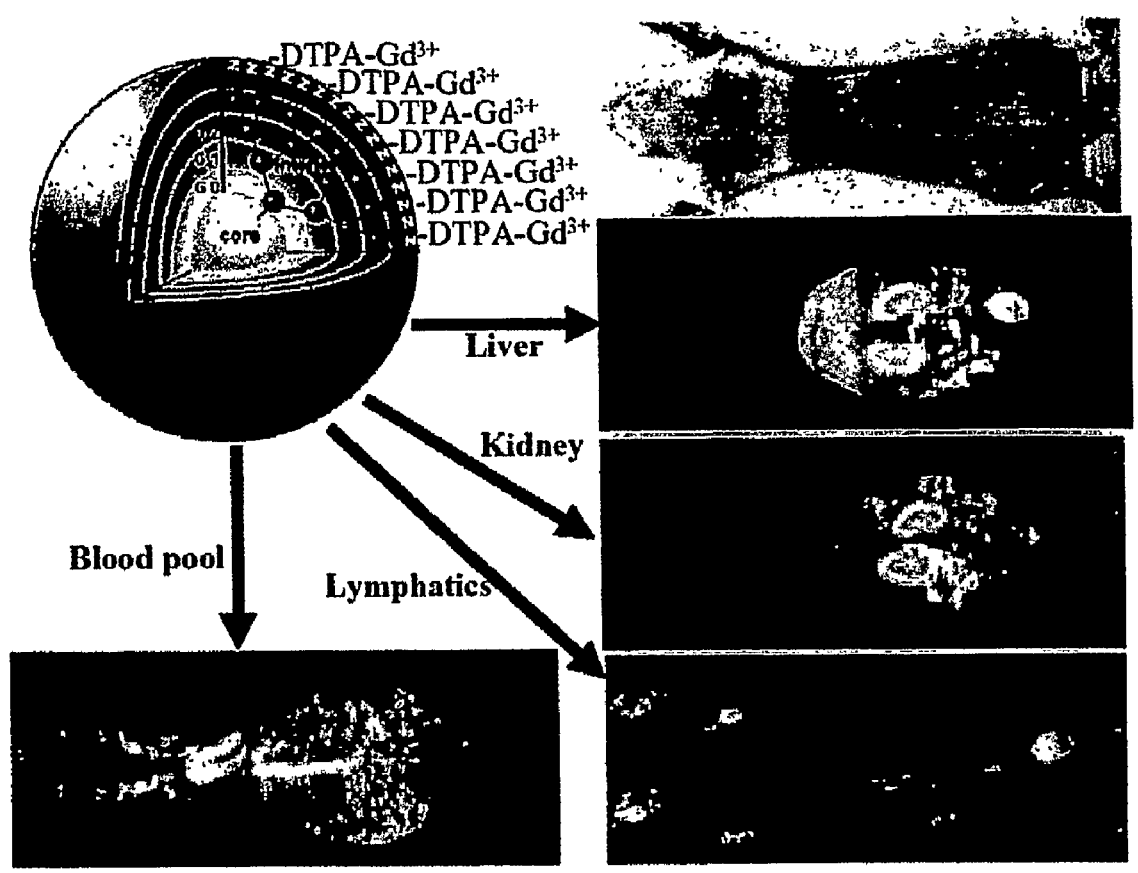
FIG. 6 illustrates a dendrimer based MRI contrast agent used for imaging specific organs or disease sites.

The conjugation of chelated paramagnetic metal ions such as Gd(III) to a macromolecule enhances the effectiveness of these ions by dramatically increasing the relaxation rates of the solvent protons [see E. C. Wiener, et al., Magnetic Resonance in Medicine, 31(1), 1-8 (1994); and E. Weiner, V. Narayanan, "Magnetic Resonance Imaging Contrast Agents Theory, and the Role of Dendrimers". In Advances in Dendritic Macromolecules, Vol. 5, pp 129-247, ed, Newkome, G. R., Elsevier Science Ltd., New York, N.Y. (2002)]. These proton relaxation enhancements result from an increase in the rotational correlation times when the chelate is attached to a macromolecular nano-scaffolding. The larger numbers of paramagnetic metal ions, specifically Gd(III), are expected to provide very high molecular relaxivities. By making such a comparison of relaxivity features for small and nano-agents corresponds to the possibility of a single dendrimer MRI agent being equivalent to over a thousand molecules of Gd[DTPA](i.e. Magnevist™). The molecular flexibility of dendrimers is also reflected in the variable nature of the interior versus exterior carbon atoms wherein the rotational correlation time of the interior increases by nearly two orders of magnitude with increase in molecular weight and size from generation 0 up to generation 7 while the exterior rate doubles. These changes in rotational correlation time also differ substantially from those obtained with traditional linear polymers, wherein segmental motions dominate the correlation time and become independent of molecular weight above 10,000. Thus, increases in the sizes of linear polymers have very little effect on their ion relaxivities. Recent studies of water exchange rates and relaxivity have reported the decreased rotational times of dendrimer versus small molecule contrast agents thus resulting in increased proton relaxivities [see E. Toth, et al., Chem. Eur. J, 2, 1607-1615 (1996)]. The impact of the internal rigidity conferred by dendrimer architecture has been assigned as a major contributor to the observed high relaxivity values. Thus, some of the more attractive features associated with macromolecular MRI contrast agents stems from their unique advantages in pharmacokinetic and size directed, passive targeting properties in conjunction with extraordinarily enhanced molar relaxivities that are more specifically associated with the use of dendrimer based MRI agents [see E. C. Wiener, et al., Magnetic Resonance in Medicine, 31(1), 1-8 (1994); and E. Toth, et al., Chem. Eur. J, 2, 1607-1615 (1996)]. Many of those unique features are illustrated in Table III and in FIG. 6.

TABLE III

Variations of Macromolecular MRI Contrast Agents*

| Agent | Core | MW (kDa) | Gd Atoms | Characteristics | Target |
|---|---|---|---|---|---|
| G4-PEG2 | EDA | 99 | 64 | Hydrophilic | Vascular |
| G4-PEG1 | EDA | 79 | 64 | Hydrophilic | Vascular |
| DAB-Am64 | EDA | 51 | 64 | Hydrophilic | Liver |
| DAB-Am32 | EDA | 25 | 32 | Hydrophobic | Liver/kidney |
| DAB-Am16 | EDA | 12 | 16 | Hydrophobic | Kidney |
| G6-Avidin | EDA | ~300 | 254 | β-D-Galactose receptor specific | Tumor |
| G6-Biotin | EDA | 238 | 254 | Can be intentionally cleared | Permeability |
| IgG-G4 | EDA | ~200 | 64 | Antigen specific | Tumor |
| IgG-G2 | EDA | ~170 | 16 | Antigen specific | Tumor |

*From H. Kobayashi and M. W. Brechbiel "Dendrimer-based Macromolecular MRI Contrast Agents: Characteristics and Application, Molecular Imaging, 2(1), 1-10 (2003).

Perhaps the most closely related macromolecular strategy to dendrimer based MRI agents is those utilizing protein scaffolding. For example, such a protein based scaffold might involve the use of serum albumin conjugated with forms of diethylenetriamine pentaacetic acid (DTPA) [see H. Kobayashi, M. W. Brechbiel, *Molecular Imaging.*, 2(1) 1-10 (2003)] to chelate gadolinium metal ions (Gd(III)) in such compounds such as [albumin-(DTPA-Gd)] as originally described by Ogan and co-workers [see M. D. Ogan, et al., *Invest. Radiol.*, 22, 665-671 (1987)]. Other researchers have extensively applied such reagents to investigate vascular anatomy and physiology especially in experimental cancer models [see F. M. Cohen, et al., *Invest. Radiol.*, 29, 970-977 (1994); R. Brasch, et al, *J. Magn. Reson. Imaging*, 7, 68-74 (1997); and M. G. Wikstrom, et al., *Invest Radiol.*, 2, 609-615 (1989)]. Much of this work defined the attractive advantages associated with the use of macromolecular MRI contrast agents as well as the limitations of small molecular weight contrast agents, particularly so in the investigation of neovasculature and angiogenesis. However, the limitations of agents based on a protein platform or core have been equally demonstrated. While useful as investigation tools, their inherent nature makes routine and consistent synthesis challenging to translate such materials into a clinical setting (e.g., preparation provides a complex distribution of products that is challenging to replicate). Therefore the reproducibility of dendrimer based MRI agents together with their non-immunogenetic features clearly presents important advantages for the synthetic nano-scaffoldings as opposed to the biological entities.

It is expected that many other applications for these Janus dendrimers are possible. Some which that are presently anticipated are transfection of all types of genetic material (such as DNA, RNA, siRNA, fragments thereof, single strands of DNA, RNA, synthetic oligonucleotides), drug delivery of small active pharmaceuticals and biomolecules (including but limited to amino acids, proteins, antibodies, natural products), biopsy staining for use in oncology, and diagnostic agents (such as contrast agents and radioactive agents like $Tc^{99m}$) by encapsulation and/or surface association with the Janus dendrimer. Because of its heterofunctionality the Janus dendrimer is suitable for use for surface modification (e.g., resurfacing fingernail and toenails, stents coatings, catheter coatings, medical device surface modifier, and bandage and wound dressings, glass, electrodes, arrays, microwells) and other applications where selection of one dendron with its functionality and pairing it with a second dendron with a different functionality where moieties can be attached to the surface of each dendron and/or encapsulated within the dendron or Janus dendrimer would be advantageous. Thus Janus dendrimers would be formed from the desired dendrons to make a combinatorial library of bifunctional structures; combined target director and signaling dendrimers; or specific targeting entities for diagnostic and therapeutic applications.

These Janus dendrimers may be formulated into a tablet using binders known to those skilled in the art. Such dosage forms are described in *Remington's Pharmaceutical Sciences*, 18$^{th}$ ed. 1990, pub. Mack Publishing Company, Easton, Pa. Suitable tablets include compressed tablets, sugar-coated tablets, film-coated tablets, enteric-coated tablets, multiple compressed tablets, controlled-release tablets, and the like. Ampoules, ointments, gels, suspensions, emulsions, injections (e.g., intramuscular, intravenous, intraperitoneal, subcutaneous), transdermal formulation (e.g., patches or application to the skin surface, suppository compositions), intranasal formulations (e.g., drops, sprays, inhalers, aerosol spray, chest rubs), ocular application (e.g., sterile drops, sprays, ointments), or application in a gauze, wipe, spray or other means at site of surgical incision, near scar formation sites, or site of a tumor growth or removal, may also be used as a suitable formulation. Kits for bioassays as biomarkers, molecular probes are possible, including use with other reagents for the assay, and instructions for their use. Customary pharmaceutically-acceptable salts, adjuvants, binders, desiccants, diluents and excipients may be used in these formulations. For agricultural uses these conjugates may be formulated with the usual suitable vehicles and agriculturally-acceptable carrier or diluent, such as granular formulations, emulsifiable concentrates, solutions, and suspensions as well as combined with one or more than one active agent.

The following examples further illustrate the present invention but are not to be construed as a limitation on the scope of the invention.

EXAMPLES

Example 1

Preparation of Janus Dendrimer from Cystamine Core PAMAM Dendrimer

[(core)=disulfide; PAMAM G=0-3; PAMAM G=0-3 (dissimilar); surface differences also possible]

Figure 4:
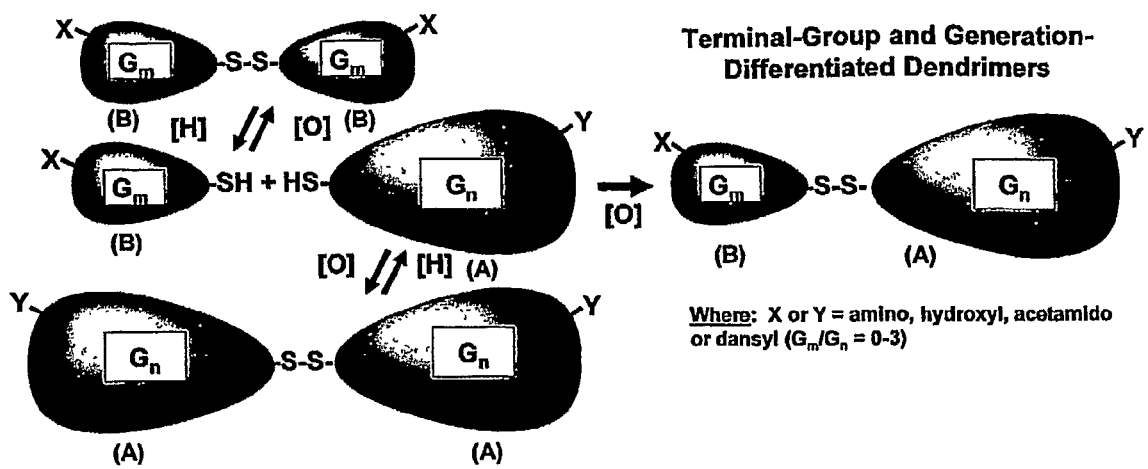
FIG. 4 illustrates Janus type dendrimers having a disulfide core.

The cystamine core; PAMAM dendrimer with a selected surface Z is reduced to the dendron mercaptan. A heterobifunctional linker, (A), reacts with the thiol of the dendron at one end leaving the one end available for reaction. In a second reaction sequence, cystamine core; PAMAM dendrimer with a selected surface, (X), is reduced to the dendron mercaptan. This thiol is reacted with one end of a second heterobifunctional reagent (B). The functional group from the unreacted end of (A) is designed to react with the unreacted end of (B). (A-B) are a connecting group. By adding one dendron to the other, one produces a Janus type PAMAM dendrimer with (X) surface groups on one end and (Z) surface groups on the other linked by this (A-B) connecting group (FIG. 4).

Example 2

Synthesis of Janus-Type Dendrimers with Hydrazone Ligation Core

[(core)=hydrazone; PAMAM G=0-3; PAMAM G=0-3 (dissimilar); surface differences also possible]

A specific example of "focal point specific ligation" for the synthesis of the second class of Janus dendrimers involves the use of well known aldehyde and hydrazine chemistry, reported by Tam, et al. [cited above] for polypeptide ligations. An aldehyde reagent can be coupled to the unique sulfhydryl of one set of di-dendrons ($G_x$) and a hydrazine reagent to the other set ($G_y$). Upon mixing the two sets of di-dendrons the specific aldehyde-hydrazine reaction results in efficient and specific formation of the desired Janus dendrimer. This approach allows combinatorial design of the (A) and (B) domains of the Janus dendrimer. Furthermore it takes advantage of well defined chemistry for which there are commercially available reagents (Solulink, San Diego, Calif.) or the vast majority of reagents can be readily synthesized.

Figure 7:
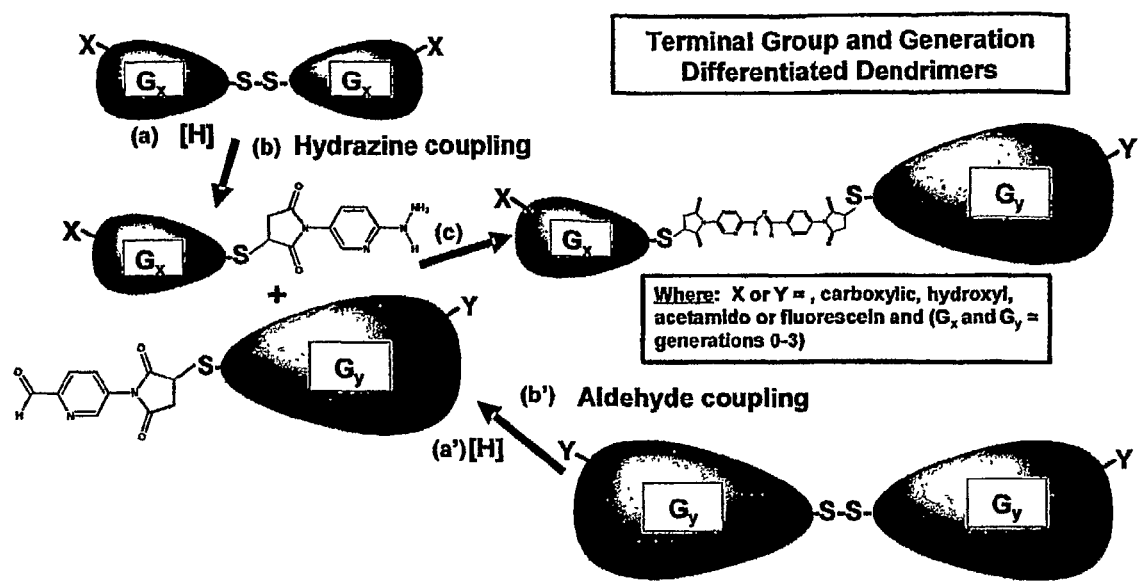
FIG. 7 illustrates a dendron focal point ligation to produce a hydrazone core.

As another example, dendron ($G_x$) is produced as described above by reduction of the disulfide. The thiol is reacted with glycidol to give the ring-opened thioether diol. Oxidation of this diol with $NaIO_4$ gives the aldehyde. Dendron ($G_y$) is reacted with the maleimidophenyl)butyric hydrazide at pH 6.5 to give the maleimide adduct. This product is then added to the mixture of dendron ($G_x$) to give the Janus molecule linked by the reaction of the hydrazide and aldehyde to give a hydrazone (See FIG. 7).

There are many combinatorial hybridizations of these reactions, linkers, differentiated dendron as function of generations/surface groups, thus making this process strategy very versatile for the synthesis of these Janus dendrimer type nanodevices.

Example 3

Synthesis of Targeted MRI Dendrimer with a Janus Dendrimer Design

[(core)=succinamide; PAMAM G=1, surface amine; Behera G=0, surface=ester]

The general synthesis of this Janus dendrimer is based on a core structure described in Wiener's paper on metal directed self-assembly of ethylene-based dendrons [see V. V. Narayanan, E. C. Wiener, *Macromolecules, A*3, 3944-3946 (2000)]. The starting point in this synthesis is meso-dibromosuccinic acid which is commercially available from Aldrich (#608-36-6). The diacid is converted to an acid chloride with thionyl chloride. The diacid chloride is converted to the succinimide with Newkome-Behera branch cell reagent. This dibromide is reacted with 2 equivalents of 1-benzyl carboxylate-(2-aminoethyl)piperazine (according to the experimental described in this paper) that used benzyl amine, the second critical intermediate is formed. This reaction sequence can be reversed if there are problems with acid deprotecting the blocking group. The succinimide can be formed by simply heating the Behera amine and the diacid thus avoiding acid hydrolysis possible from thionyl chloride.

The benzyloxycarbonyl blocking group is removed by a mild catalytic hydrogenation using Pd/carbon to give two piperazines. Piperazines are reacted with methylacrylate and excess ethylenediamine iteratively to form an amine or ester surface dendron. This reactive dendron is reacted with a chelate derivatized PAMAM dendron produced by the reduction of cystamine core PAMAM dendrimer and addition of an appropriate linker. This process gives amplification of the surface chelates as a multiple of the number of Janus dendron surface groups times the number of surface chelates on the cystamine core dendron.

The cystamine core PAMAM dendrimer primary amine surface is reacted with chelate isothiocyanate. This chelate derivatized PAMAM dendrimer is then cleaved at the disulfide with DTT and resulting mercaptan dendron reacted with the Janus molecule. Steric congestion of the larger dendrons such as G=2 or 3 may prevent fill functionalization of all the Janus dendrimer surface groups. Heterobifunctional reagents that extend the mercaptan tail by 6 to 12 atoms can react with the sulfur end of the dendron leaving a reactive end of the reagent to link with the Janus dendrimer surface. 4-(4-N-Maleimidophenyl)butyric acid hydrazide is one such heterobifunctional cross-linking reagent that contains an epoxide reactive hydrazide group on one end and a sulfhydryl reactive maleimide on the other. There are several such linkers that are commercially available at various lengths. Also, the linker can be attached to the Janus molecule followed by reaction of the remaining reactive end with the dendron. [See reaction below.]

At this stage of the synthesis, the imaging half of the Janus molecule has been constructed. The tert-butyl esters are then removed with formic acid. This acid is then equilibrated with excess ethylenediamine or tris(2-aminoethyl)amine and coupled with carbodiimide. A primary amine surface is available for conjugating proteins for the targeting end of the Janus dendrimer. [See reaction scheme below. Three dendrons form the Janus dendrimer.]

A second option for the targeting end is to equilibrate a PAMAM dendrimer with an amine surface with this acid and coupling with carbodiimide. Again, the PAMAM dendrimer surface is available with several coupling sites for the proteins and several generations or sizes to choose from. [See reaction scheme below.]

A third option is further reiteration with Behera branch cell reagent by equilibrating with the acid and carbodiimide coupling as described in Wiener's paper. This gives more surface groups if needed and/or better presentation for conjugation.

The following Scheme shows the various reaction steps and molecules formed.

Scheme Example 3

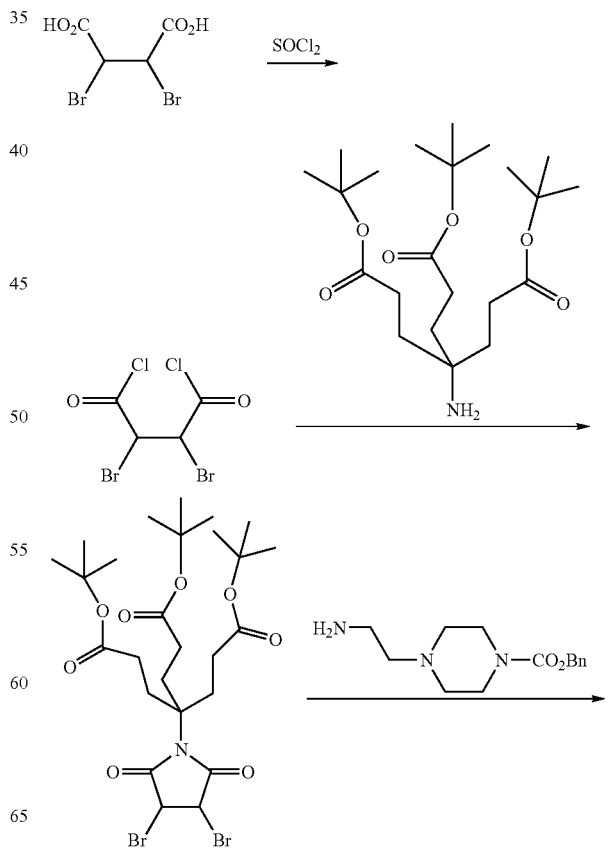

19
-continued
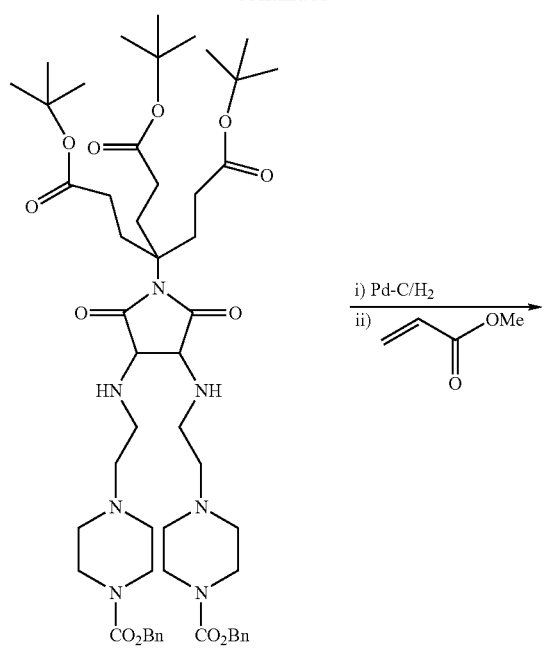
20
-continued
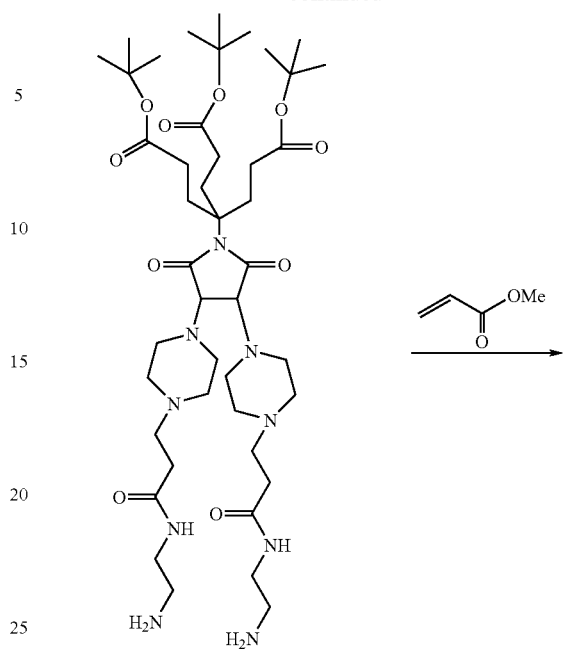
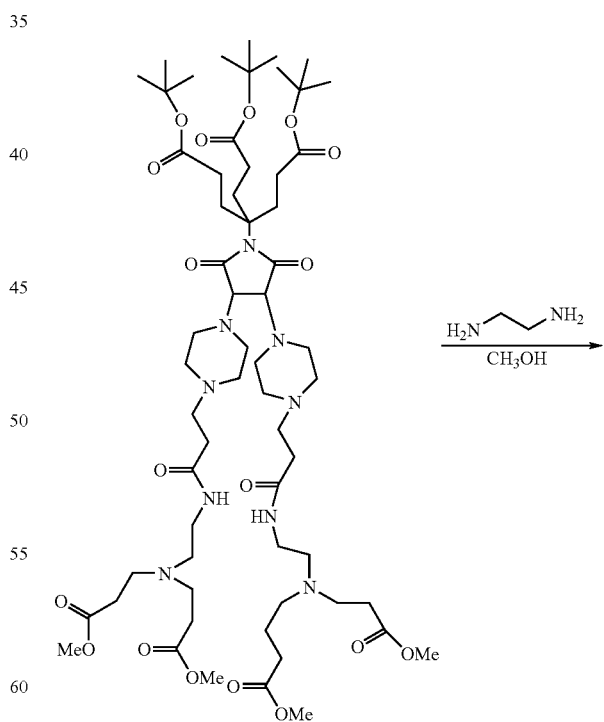

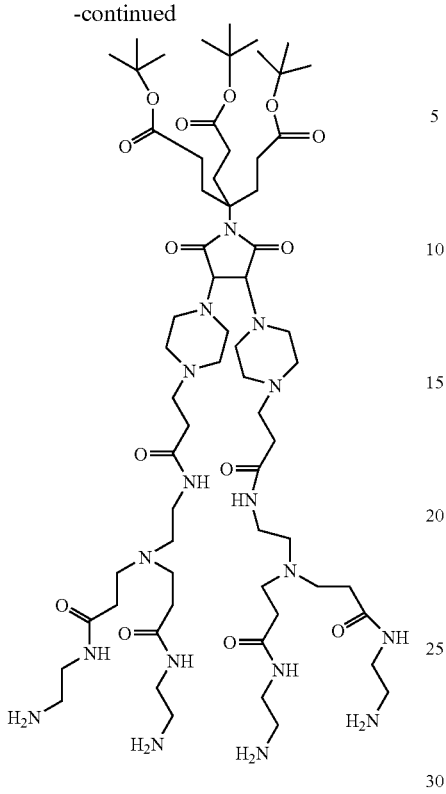

methyl isobutyl ketone. This mixture was heated at 120-130° C. (bath temperature) with the flask fitted with a Dean-Stark trap and a condenser under $N_2$. After 2 hours 1.9 mL water of 2.2 mL theoretical was azeotroped. At 3 hours the theoretical amount of water was azeotroped. The mixture was refluxed another 5 hours, cooled to 25° C. and sealed under $N_2$ for storage at room temperature. Aliquots were removed as needed according to calculated molarity and solvent removed by high vacuum. $^1H$ NMR (500 MHz, $CDCl_3$) δ 0.90 (d, J=6.0 Hz, 6H), 1.44 (bm, 1H), 1.81 (s, 3H), 2.12 (d, J=7.0 Hz, 2H), 2.49 (bm, 4H), 2.63 (t, J=7.0 Hz, 2H), 2.89 (t, J=7.0 Hz, 4H), 3.39 (t, J=7.0 Hz, 2H).

$^{13}C$ NMR (125 MHz, $CDCl_3$) δ 17.51, 22.43, 26.13, 46.16, 49.09, 51.81, 55.03, 59.81, 170.20.

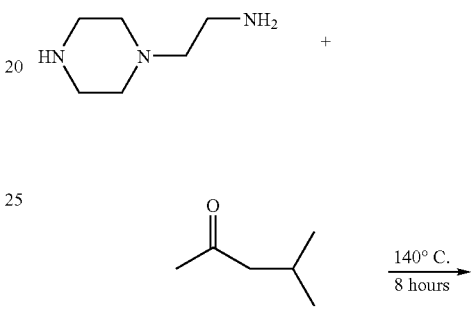

N-(4-methylpentan-2-ylidene)-2-(piperzin-1-yl)ethanamine

Example 4

Synthesis of Targeted MRI Dendrimer with Janus Dendrimer Design

[(core)=succinamide; PAMAM G=1, surface modified DTPA; Newkome-Behera G=0, surface=PAMAM amine surface/protein linker/protein]

A second scheme begins in much the same manner as previously described. An alternative to more functionality for the targeting side of this Janus molecule is to equilibrate the acid with one equivalent Behera amine under mild conditions followed by coupling with carbodiimide. This methodology prevents closure to succinimide and produces twice the functionality for future targets. Both intermediates will be pursued since these are very early on in the synthesis.

The dibromides will be converted to amines as before with 1-benzyl carboxylate-(2-aminoethyl)piperazine followed by blocking group removal using catalytic hydrogenation to give piperazines. Piperazines are iteratively reacted with methylacrylate and excess ethylenediamine to give the dendrimer as before.

Figure 8:
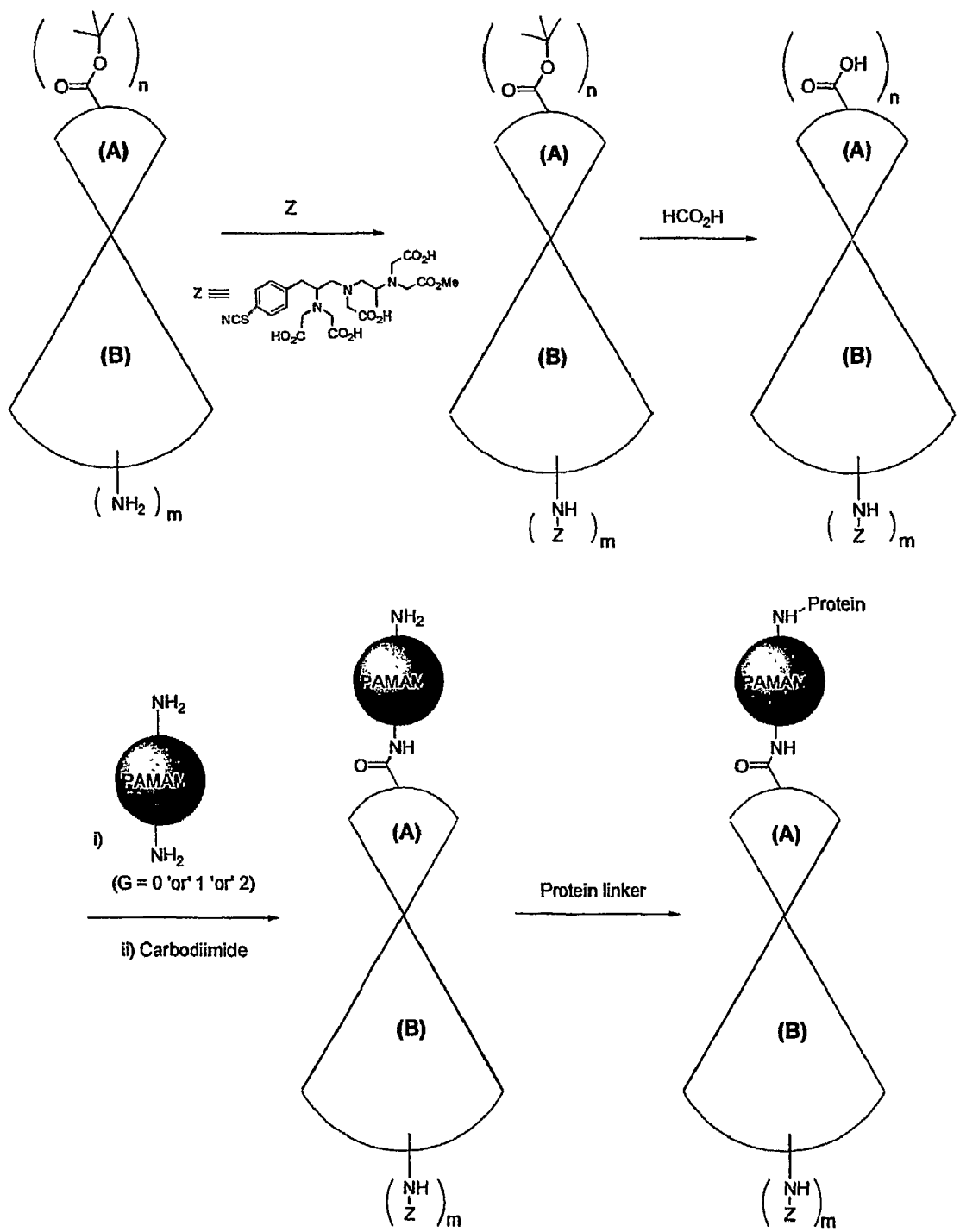
FIG. 8 illustrates the bioconjugation of targeting groups (such as folic acid, a, integrins etc., VEGF, growth factor antibodies, antibody Fab fragments, hyaluronic acid, cyclic peptides, etc.) and signaling groups (such as $Gd^{+3}$ chelates) to the Janus dendrimer scaffolding.

FIG. 8 shows the targeting groups and signaling groups attachment made by this process.

Example 5

Preparation of a Intermediate Janus Dendron with an AB₃ Monomer Using PETGE with Methylisobutyliminoethylpiperazine, Ethyl-1-Piperazine Carboxylate, and N-SIS Results

[(core)=PETGE; MIBEP G=0, surface=amine]
Preparation of Methylisobutyliminoethylpiperazine:
To a 500 mL round bottom flask containing a stir bar was added aminoethylpiperazine (16 g, 124 mmol) and 250 mL of Part A: In this experiment three equivalents of methyl-isobutyliminoethylpiperazine were used per PETGE. The reaction to form the 3:1 adduct was completed within 24 hours at 40° C. About 10 equivalents of piperazine per remaining epoxide were added to the mixture. The rational was that removal of the bulky blocking group present in ethyl 1-piperazine and using high reagent excess to prevent extensive crosslinking should help evaluate the accessibility of piperazine to the epoxide. After 60 hours at 70° C. and 24 hours at 100° C. in propylene glycol, only a trace of the desired product was observed by MALDI-TOF mass spectroscopy. The tetra-substituted product from the imine was observed. Apparently this reagent also is too large for a facile access to the epoxide under these conditions. Piperazine occupies a relatively large space due to the natural spinning of the molecule along the axis of the two nitrogens which is presumably the line of attack of the nitrogen to ring open the epoxide. At this point with methylisobutyliminoethyl-piperazine as a ligand for PETGE in an AB₃ intermediate, both monoblocked piperazine (ethyl 1-piperazine carboxylate) and piperazine do not react with the fourth unreacted epoxide. Thus N-SIS would explain why this reaction did not occur. See the reaction scheme below.

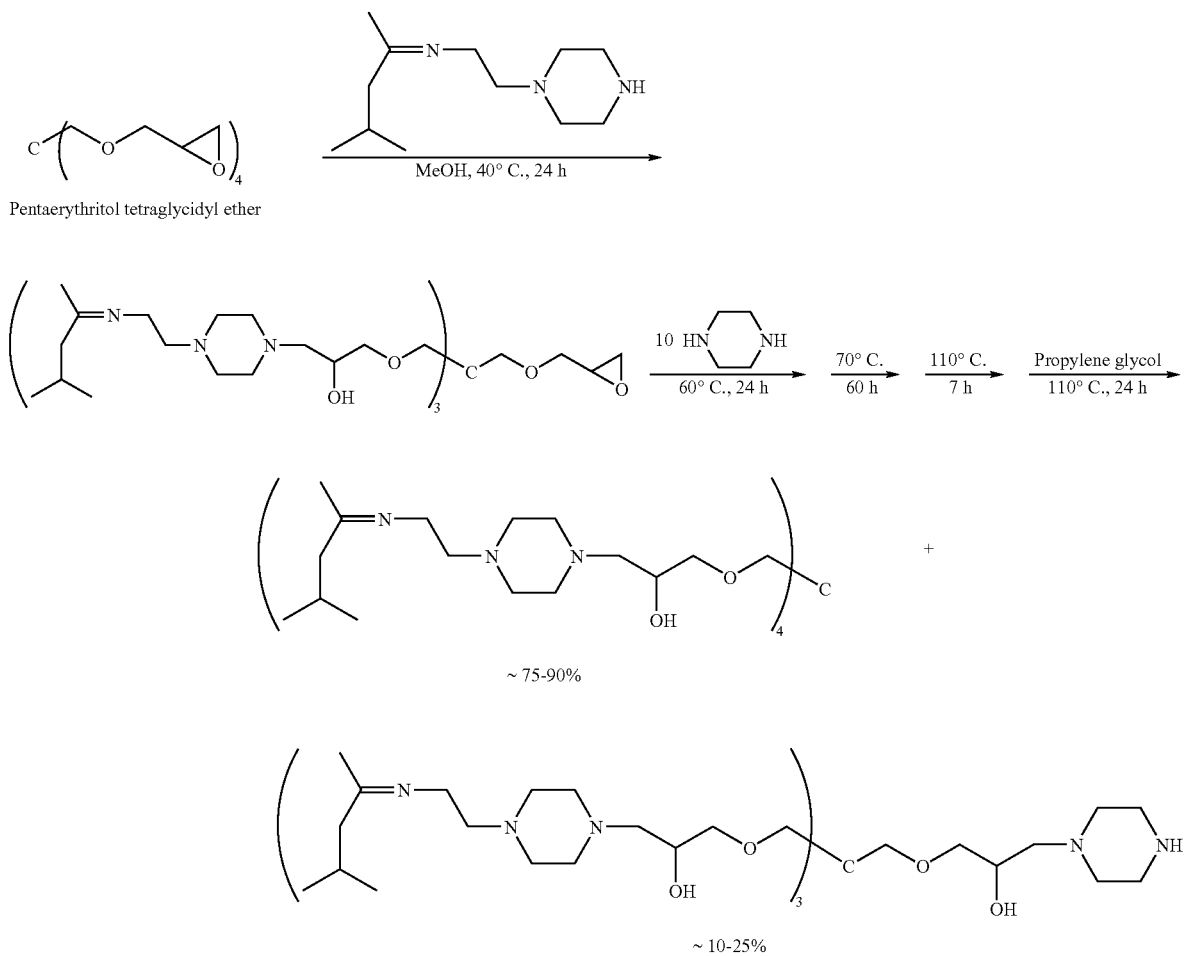

Scheme Example 5A

Part B: In this experiment, the $AB_3$ monomer intermediate was formed at 25° C. for 48 hours to presumably eliminate any possibility of looping. The fourth epoxide was reacted with ethylenediamine (EDA) using a 22 equivalents excess. It was assumed that a room temperature reaction of EDA would probably not work with this ligand. Therefore, this reaction was begun at 60° C.

A MALDI-TOF mass spectrum of the $AB_3$ mixture after 48 hours at 25° C. showed the usual relatively clean 3:1 adduct at 748 amu. Minor peaks for the 2:1 and 4:1 adducts were also observed. It is clear from the mass spectral data and TLC (30% $NH_4OH$ in MeOH) that >80% of the material is $AB_3$ intermediate. It seems apparent that N-SIS is channeling these substrates to go to an $AB_3$ in a facile manner. Longer reaction times, excess reagent and temperature can individually or in concert drive the reaction to the $AB_4$ product.

The reaction of EDA with this $AB_3$ intermediate at 60° C. for 60 hours showed some reaction to give at most ~20% of the desired product. Heating this product in propylene glycol at 110° C. for 24 hours gave an increased yield of the desired product but large signals for the unreacted $AB_3$ at 748 amu and for the 4:1 adduct at 899 amu were also present. Once again, this $AB_3$ intermediate shows sluggish reactivity to EDA. A TLC (30% NH4OH-MeOH) showed a major spot at $R_f=0.45$ for the 4:1 adduct (MW=899) and a spot of lower intensity at $R_f=0.4$ for the 3:1+EDA adduct (MW=808). This desired product is about 10-20% of the material.

The $AB_3$ intermediate derived from methylisobutylimino-ethylpiperazine in MeOH was found not to react with mono-blocked piperazine giving a low yield of product with piperazine and a 20-30% reaction with FDA. In all cases the reactions take a long time and need around 100° C. to begin to see product with low yields of desired material. Models of this particular $AB_3$ monomer indicate that this fourth unreacted epoxide is open for reaction. It is thought that the amino alcohols generated in the first reaction may well be hydrogen bonding internally and closing the structure around that last epoxide making it essentially unavailable for reaction. Solvents that can efficiently break the hydrogen bonding may allow this $AB_3$ substrate to react with the last epoxide with a suitable desired substrate. Also, preparing an aminoethylpiperazine with a smaller blocking group may enhance the reactivity of the $AB_3$ substrate.

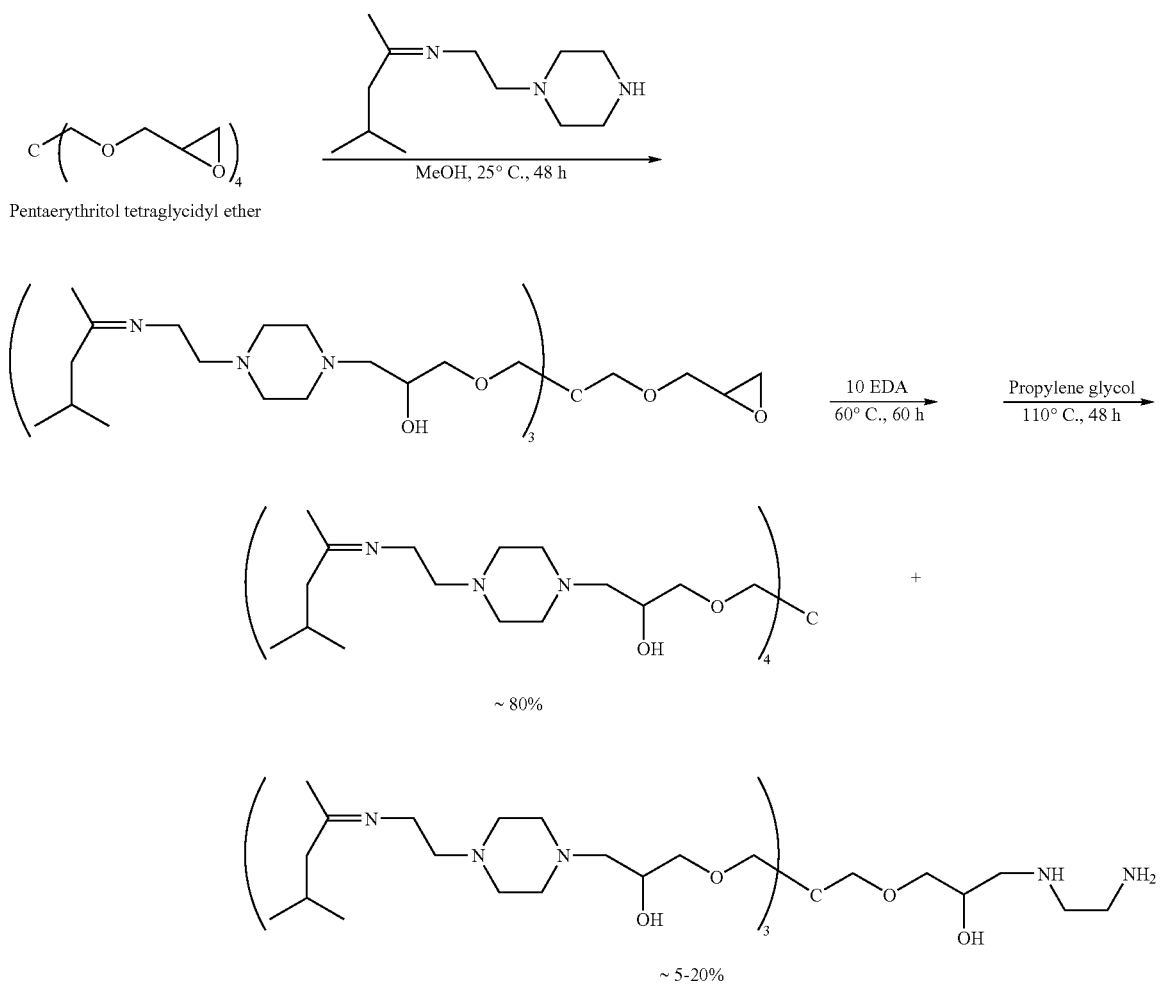

Scheme Example 5B

Example 6

Preparation of an Intermediate Janus Dendron with an AB$_3$ Monomer Using PETGE with Ethyl 1-Piperazine Carboxylate and N-SIS Results

[(core)=PETGE; EPC G=0, surface=ester]

A smaller ligand, ethyl 1-piperazine carboxylate, was used for reaction with PETGE. A monitoring of the reaction by TLC to make the 4:1 adduct with PETGE, four equivalents monoblocked piperazine per PETGE, indicated that the first three piperazines added smoothly in just a few hours at 25° C. The fourth piperazine added very slowly and required several more hours to complete at 25° C. Higher temperatures completed the reaction in about 8-10 hours with an excess of reagent of about 1.5 equivalents per epoxide.

Based on this observation an AB$_3$ was prepared from these two substrates using 3 piperazines to one PETGE. The reaction after 7 hours at 25° C. in MeOH was found to be a mixture of 1:1, 2:1 and 3:1, with 2:1 predominating as determined by MALDI-TOF mass spectroscopy. This result is consistent with the data obtained with 4 equivalents of piperazine per PETGE where the mass spectrum showed predominantly 3:1 with some 2:1 and 4:1 adducts present.

After 24 hours at 25° C. the mixture was predominantly 3:1 adduct with significant peaks for 2:1 and 4:1 adducts present in higher percentages than observed in with the corresponding methylisobutyliminoethylpiperazine-PETGE adduct. This mixture was reacted at 25° C. with ~10 equivalents EDA per remaining epoxide for 18 hours. With a presumed more open structure available for reaction using N-SIS rational, EDA and 25° C. were chosen as the first probe. The MALDI-TOF mass spectrum indicated all the 2:1 adduct at 677 amu had reacted with EDA to form 2:1+1 EDA at 737 amu and some 2:1 adduct+2 EDA+Na at 819 amu. The mass at 737 amu is probably looped material where 1 EDA has reacted with both epoxides.

Heating this mixture at 40° C. and 100° C. does not change the intensity of this peak. The 3:1 adduct at 835 amu was the predominant species in the mixture and had also reacted with EDA to form the next most abundant species at 895 amu for 3:1+1 EDA (3:1+1 EDA+Na at 917 amu). Heating this mixture 24 hours at 40° C. did not change this composition very much. Heating this resulting mixture at 100° C. in propylene glycol for 24 hours gave a much higher percentage of the desired product, 3:1+1 EDA, with that species dominating the mixture. However, significant quantities of 3:1 adduct at 845 amu were still present. Presumably, the fourth epoxide in this AB$_3$ adduct had reacted internally to form a loop by quaternization with one of the tertiary nitrogens. This reaction mixture was ultrafiltered as before to give 450 mg of product.

Scheme Example 6

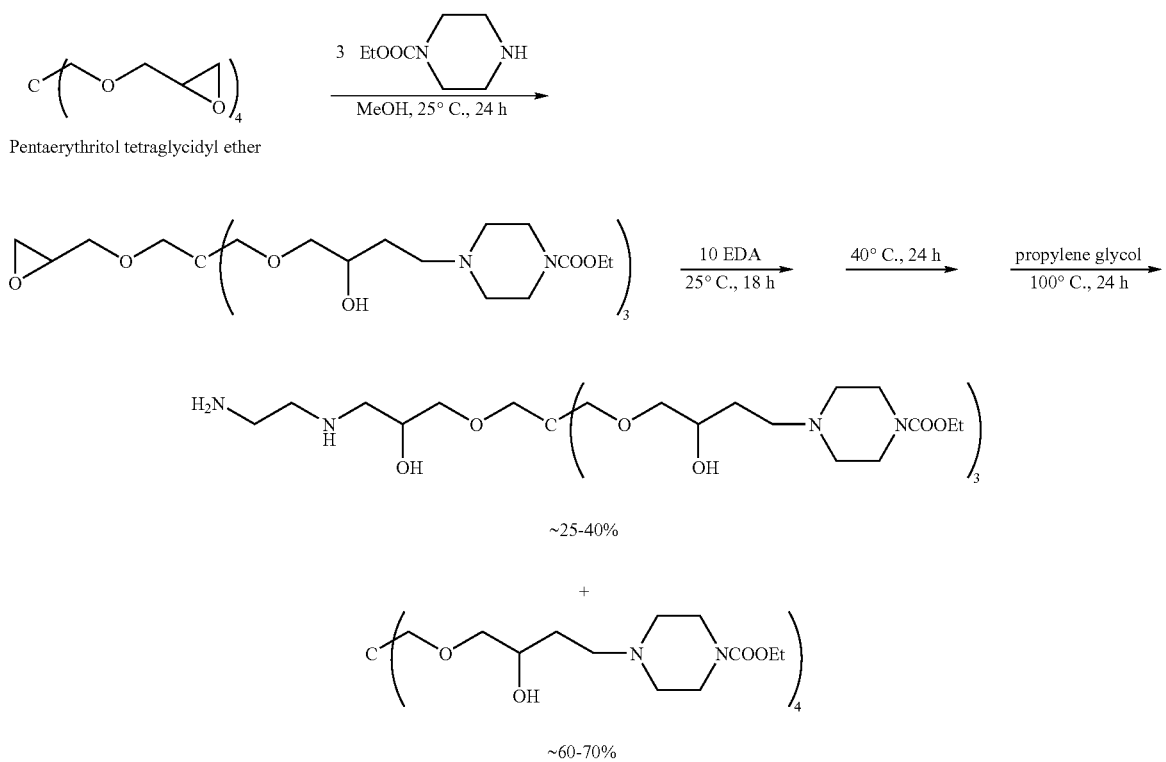

Example 7

Preparation of an Intermediate Janus Dendron with an AB$_3$ Monomer Using PETGE with Ethyl 1-Piperazine Carboxylate and N-SIS Results

[(core)=PETGE; EPC G=0, surface=ester/amine]

This experiment was done as in Example 6 except the formation of the AB$_3$ substrate was completed in 6 hours at 40° C. instead of 24 hours at 25° C. and hexamethylenediamine was added instead of EDA to give a longer more accessible tether and a more discernable product by TLC.

After 6 hours at 40° C. the reaction mixture looked the same as before by MALDI-TOF mass spectroscopy. Evidence accumulated thus far indicates that forming this AB$_3$ substrate quickly will provide a higher yield of desired product. The hexamethylenediamine was added at about 9 hours into the reaction (time to obtain mass spectrum). This mixture was heated for 18 hours at 40° C. A mass spectrum indicated a peak at 793 amu for the 2:1 adduct+1 diamine (likely looped), unreacted 3:1 adduct, 3:1 adduct+1 diamine at 952 (M+Na at 973) and 4:1 adduct at 993 amu (M+Na at 1015). Heating this mixture at 110° C. for 24 hours in propylene glycol showed the complete disappearance of starting 2:1 and 3:1 adducts to give the products just stated above.

The mixture was ultrafiltered in MeOH as before to give a material that showed two major spots by TLC: one spot corresponding to the authentic 4:1 adduct as about 60% of the mixture and another spot of lower R$_f$ for the desired Janus product 3:1 adduct+diamine as about 40% of the mixture. The mass balance of this reaction is consistent with the molecular weights of the products 4:1 adduct (MW=992) and 3:1 adduct+diamine (MW=950) and the ratio of products by TLC. Essentially all the PETGE that had reacted was recovered as some product either 4:1 adduct or 3:1 adduct. It was not clear where the spot for the reacted 2:1 adduct was on TLC and how much is actually present.

Scheme Example 7

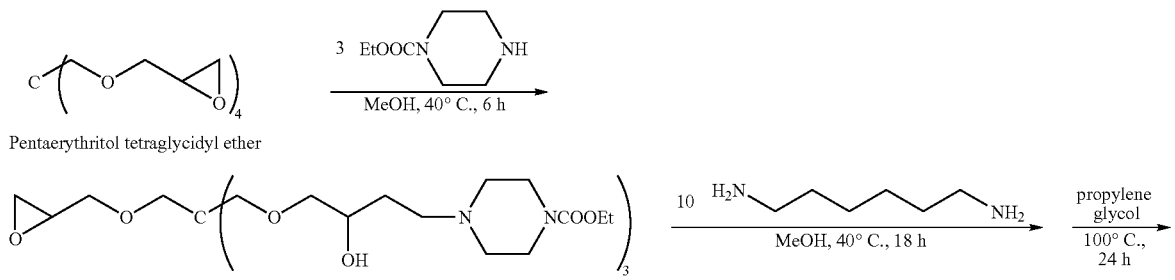

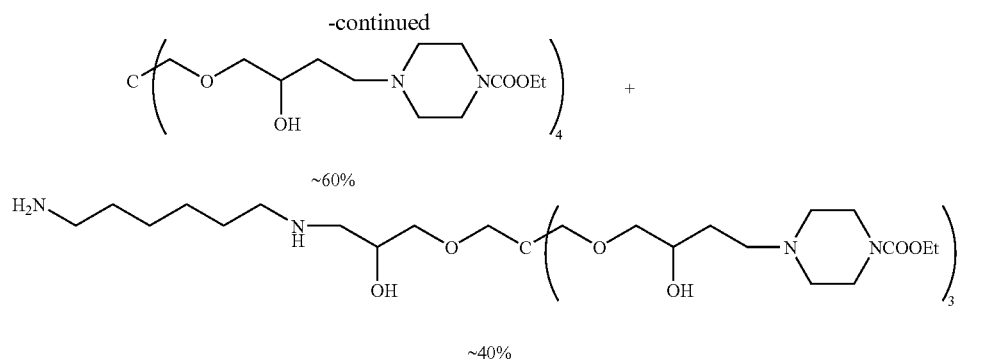

~60%

~40%

Example 8

Preparation of an Intermediate Janus Dendron with an AB$_3$ Monomer Using PETGE with Blocked Aminoethyl Piperazine and N-SIS Results

[(core)=PETGE; MIPIEP G=0, surface=amine]

In this experiment the reaction of a blocked aminoethyl piperazine with PETGE was examined. A smaller blocking group was employed with the preparation of methylisopropyliminoethylpiperazine from methyl isopropyl ketone. This blocking group should sweep out a smaller cone volume and provide space in the resulting AB$_3$ monomer for subsequent reaction to the desired product. This reaction mixture prepared as before was heated at 40° C. for 6 hours with indications by mass spectrum that this reaction had not gone to completion for formation of the Janus dendrimer. A mass spectrum after 24 hours at 40° C. indicated very small signals for the 2:1 and 4:1 adducts and one peak for the desired 3:1 adduct.

This mixture was heated with excess EDA and 100° C. in propylene glycol for 24 hours. A mass spectrum indicated only two products were present: the desired 3:1+EDA product and the 4:1 adduct as the predominant signal. Although the results were not as good as expected this AB$_3$ intermediate forms faster than the corresponding AB$_3$ from methylisobutyliminoethylpiperazine.

Preparation of Methylisopropyliminoethylpiperazine:

To a 500 mL round bottom flask containing a stir bar was added aminoethylpiperazine (16 g, 124 mmol) and 250 mL of methyl isopropyl ketone. This mixture was heated at 120-130° C. (bath temperature) with the flask fitted with a Dean-Stark trap and a condenser under N$_2$. After 2 hours 1.9 mL water of 2.2 mL theoretical was azeotroped. At 3 hours the theoretical amount of water was azeotroped. The mixture was refluxed another 5 hours, cooled to 25° C. and sealed under N$_2$ for storage at room temperature. Aliquots were removed as needed according to calculated molarity and solvent removed by high vacuum.

$^1$H NMR (500 MHz, CDCl$_3$) δ 1.042 (d, 6.0 Hz, 6H), 1.42 (bm, 1 Hz), 1.77 (s, 3H), 2.49 (bm, 4H), 2.63 (t, J=6.0 Hz, 2H), 2.89 (bm, 4H), 3.39 (t, J=6.0 Hz, 2H).

$^{13}$C NMR (125 MHz, CDCl$_3$) δ 14.41, 19.79, 40.08, 46.18, 48.99, 55.09, 59.87, 174.73

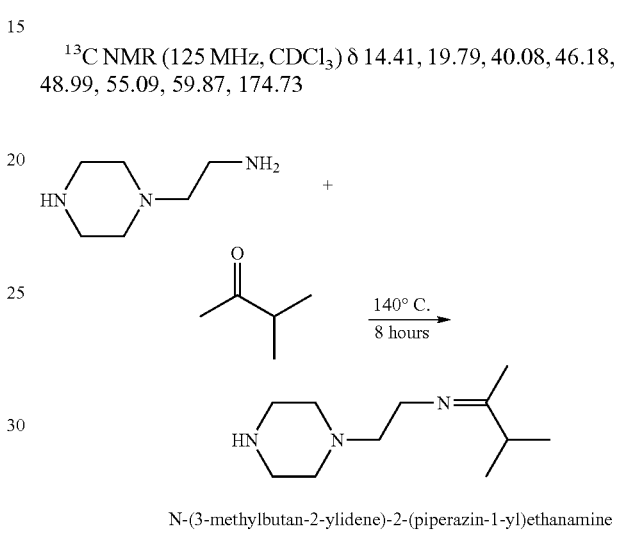

N-(3-methylbutan-2-ylidene)-2-(piperazin-1-yl)ethanamine

To a 10 mL round bottom flask containing a stir bar was added methyl isobutyliminoethylpiperazine (726 mg, 3.44× 10$^{-3}$ moles, 3 equivalents) and 4 g MeOH. To this mixture at 25° C. was added pentaerythritol tetraglycidyl ether (307 mg, 0.853 mmol, 3.4 mmoles epoxide). This mixture was stirred and heated at 60° C. for 6.5 hours. To this mixture was added ethyl t-piperazine carbamate (537 mg, 3.4 mmol) and this mixture heated at 60° C., 16 hours, 60° C., 54 h with no adduct for the desired product at 906 or 833 (decarboxylated material). Another aliquot of monoblocked piperazine was added (1.5 g) and this mixture was heated at 70° C., 16 hours, 24 hours and 60 hours total with no sign of desired adduct. The 3:1 adduct at 748 amu was completely converted to 4:1 adduct at 993 amu by reaction of remaining equivalent imine in presence of a total of 16 equivalents of ethyl 1-piperazine carboxylate. This mixture was purified by tangential flow ultrafiltration using a 1K regenerated cellulose membrane at 20 psi as a 2-5% w/w mixture in MeOH to give 8-9 recirculations. The retentate was stripped of volatiles on a rotary evaporator followed by high vacuum to give 590 mg. The following scheme illustrates this reaction.

Scheme Example 8

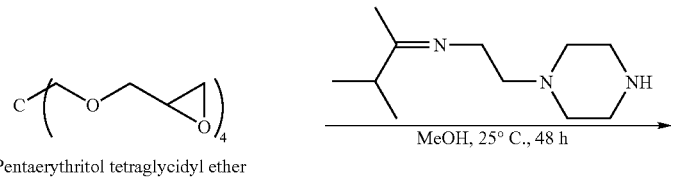

Pentaerythritol tetraglycidyl ether

MeOH, 25° C., 48 h

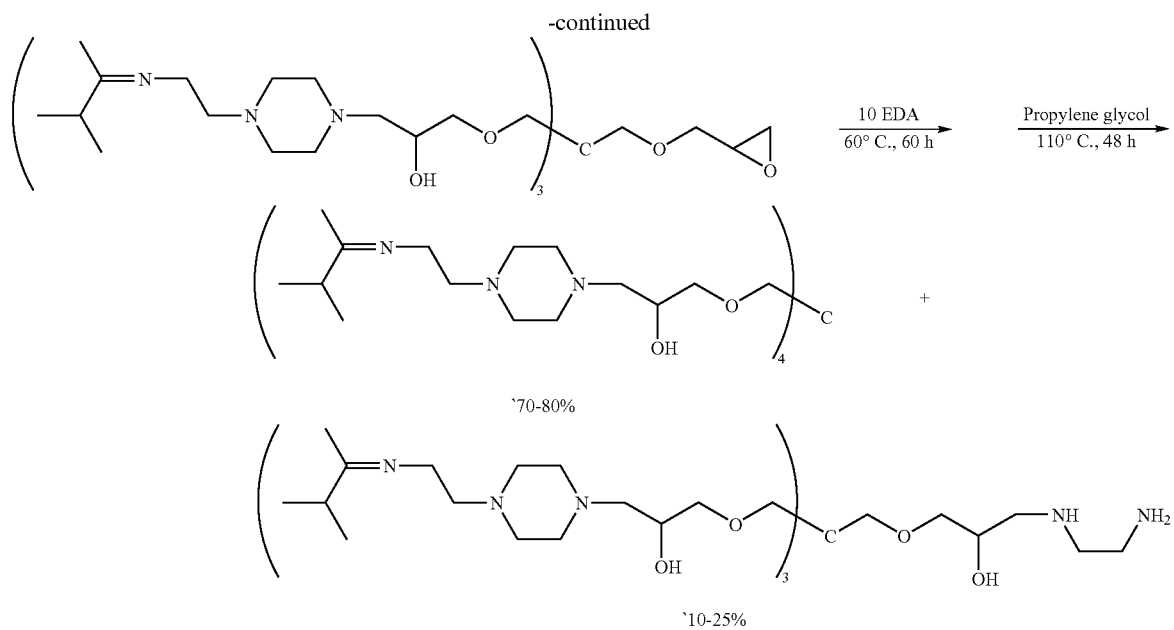

'70-80%

'10-25%

Example 9

Part A

Synthesis of Pyrrolidone Surface Cystamine Core (G=0) PAMAM Dendrimer from G=0 PAMAM

[(core)=cystamine; PAMAM G=0, surface=pyrrolidone]

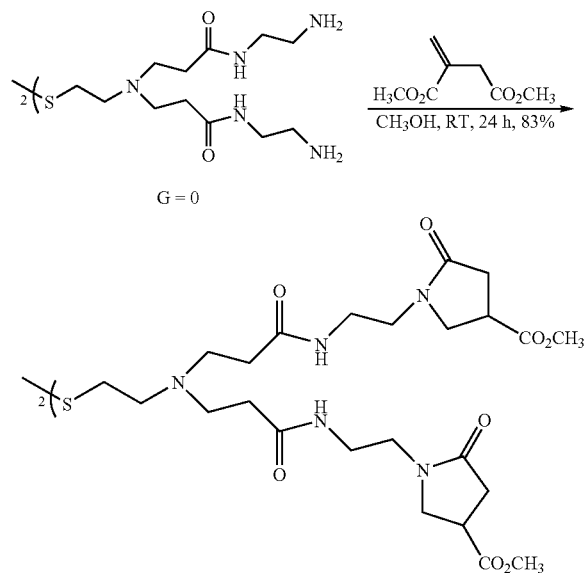

Dimethyl itaconate (DMI) (2.654 g, 2.736 g, 16.8 mmol) (Acros) and methanol were taken in a 50 mL, single necked round bottom flask (RB) and the flask was cooled to 0-4° C. with an ice-bath. After 10 min, PAMAM (G=0) (12.16 g, 4 mmol, in 20% w/w in methanol) was added through a dropping funnel drop-wise over a period of 30 min. After completing the addition the ice-bath was removed and stirring continued at room temperature (RT) for 2 days. Thin layer chromatography (TLC) (3:1 mixture of DCM, methanol & 10 drops of $NH_4OH$), indicated pyrrolidone surface dendrimer (G=0) as a major compound along with one other spot. At this time another 0.25 equiv. of DMI (dissolved in 1 mL of methanol) was added to the above reaction mixture. After being stirred for 4 h, TLC showed only one spot. Solvent was removed on a rotary evaporator and crude material was purified by column chromatography over silica gel (1% $NH_4OH$ solution in 3:1 of DCM+methanol) gave 3.657 g (83%) of pure dendrimer.

Part B

Addition of Cystamine Core Pyrrolidone Surface (G=0) Dendron to Pentaerythritol Tetraglycidyl Ether (PETGE)

[(core)=PETGE; PEHAM/PAMAM G=1, surface=pyrrolidone]

Dendrimer (G=0) (1.114 g, 1 mmol) and dry methanol (bubbled with $N_2$ for 10 min) were taken in a 100 mL, single necked RB and flushed with $N_2$. Dithiothreitol (DTT) (0.146 g, 0.95 mmol) (Acros) was dissolved in methanol (2 mL) and added into the above reaction mixture. Stirring continued at RT under $N_2$ atmosphere for 20 h. TLC (3:1 mixture of DCM, methanol & 2 drops of $NH_4OH$) indicated complete consumption of DTT. PETGE (0.136 g, 0.38 mmol/0.75 equiv./—SH) in methanol (1 mL) was added and stirred for 20 h. MALDI-TOF MS indicated mass for only a mono addition product. The reaction mixture was heated at 45° C. for 1 day, at this time it was found that all four possible products were formed and identified by MALDI-TOF MS. The mono-addition product at 942.363 amu, bis-addition product at 1499.392 amu, tri-addition product at 2056.186 amu and the tetra-addition product at 2613.705 amu. The reaction scheme is shown below.

Scheme Example 9
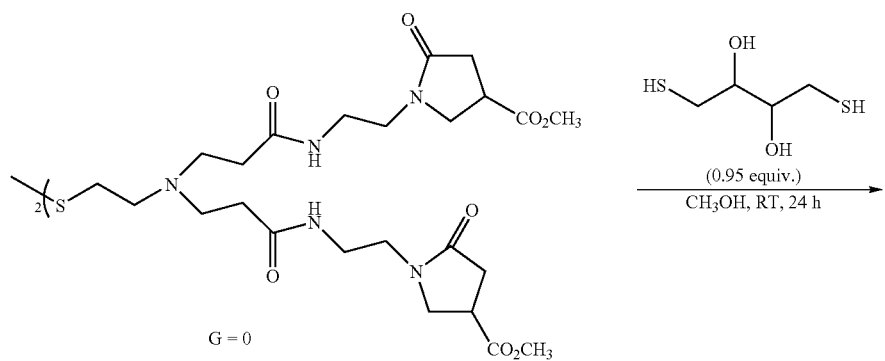
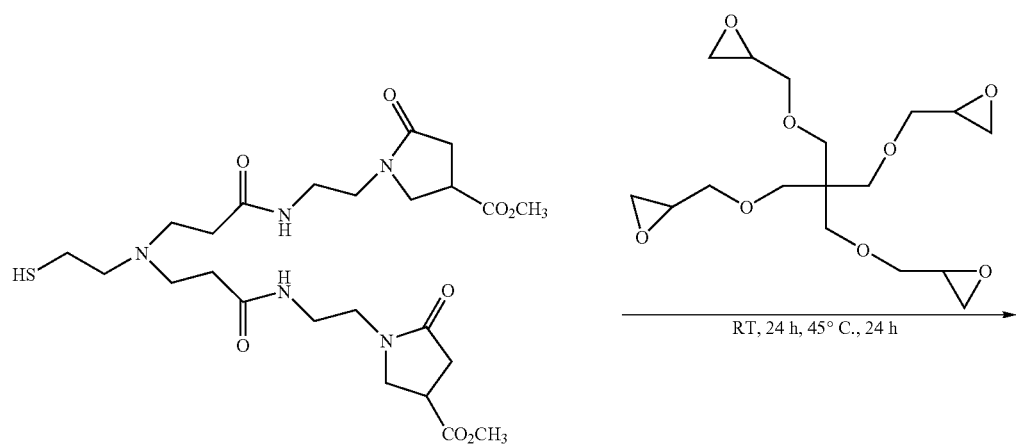
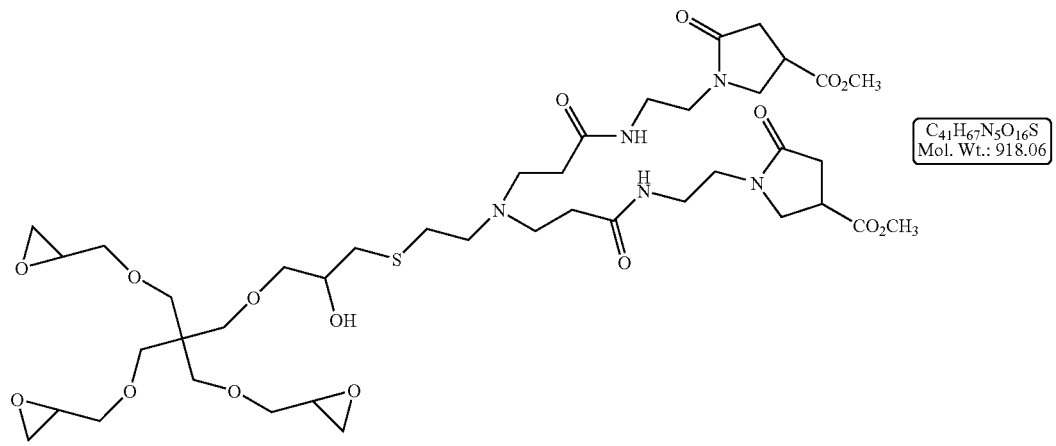

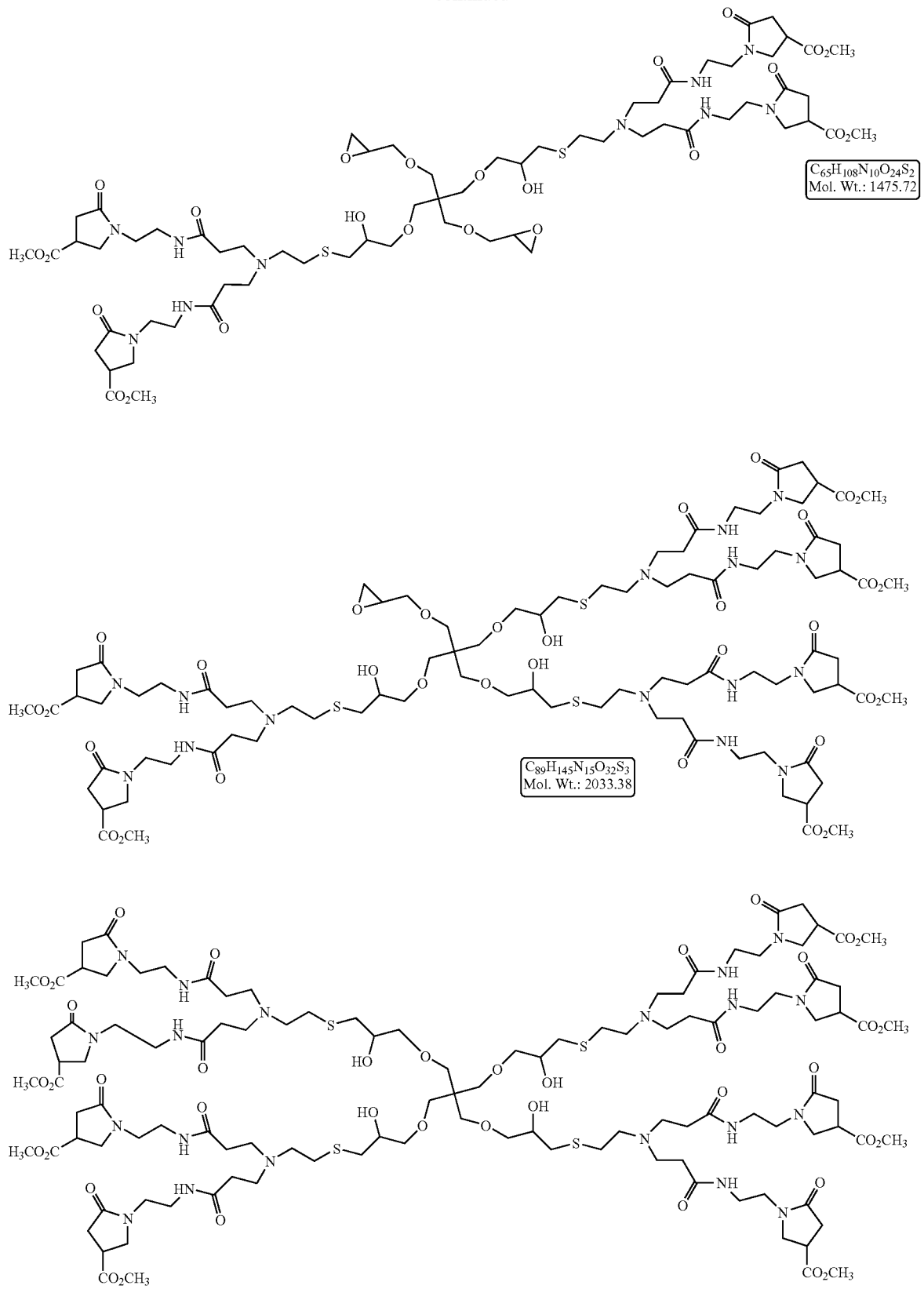

Example 10

Preparation of Mono-, Bis- and Tri-Piperazine Janus Dendrimers

[(core)=sulfur; PEHAM G=1, surface=epoxy/ester; PAMAM G=1, surface=pyrrolidone]

a) Dendrimer (G=0) (2.158 g, 1.93 mmol) and dry methanol (10 mL) (bubbled with $N_2$ for 10 min) were taken in a 100 mL, single necked round bottom flask (RB) and flushed with $N_2$. DTT (0.308 g, 2 mmol) was dissolved in methanol (2 mL) and added into the above reaction mixture. Stirring continued at RT under $N_2$ atmosphere for 20 h. TLC (3:1 mixture of DCM, methanol & 2 drops of $NH_4OH$) indicated complete consumption of DTT.

b) PETGE (2.08 g, 5.79 mmol, 6 epoxy equiv./HS was taken in a 100 mL single necked round bottom flask and dissolved in dry methanol (degassed with bubbling $N_2$ for about 15 minutes) and cooled to 5° C. Dendron from step Part B(a) was transferred into dropping funnel and added to the above cooled PETGE solution drop-wise over a period of 25 minutes. After completing the addition the reaction mixture was allowed to warm to RT. After 24 hours, MALDI-TOF spectrometry showed mass at 840.734 amu for mono-dendron addition product to PETGE. After 3 days of stirring at RT, MALDI-TOF indicated mass at 835.722 amu for mono and a tiny peak at 1234.934 amu for bis-dendron addition product.

c) The above reaction mixture in Part B(b) was quenched with ethyl-N-piperazinecarboxylate (3.659 g, 23.15 mmol) in methanol (5 mL, degassed) at RT. Stirring continued for 1 day and the reaction mixture was analyzed by MALDI-TOF and it showed mixture of the mono-piperazine addition product at 835.722 amu, bis-piperazine addition product at 1234.934 amu and tri-piperazine addition product at 1415.040 amu. However, the reaction never went to completion even after 3 weeks. The reaction scheme is shown below.

Scheme Example 10

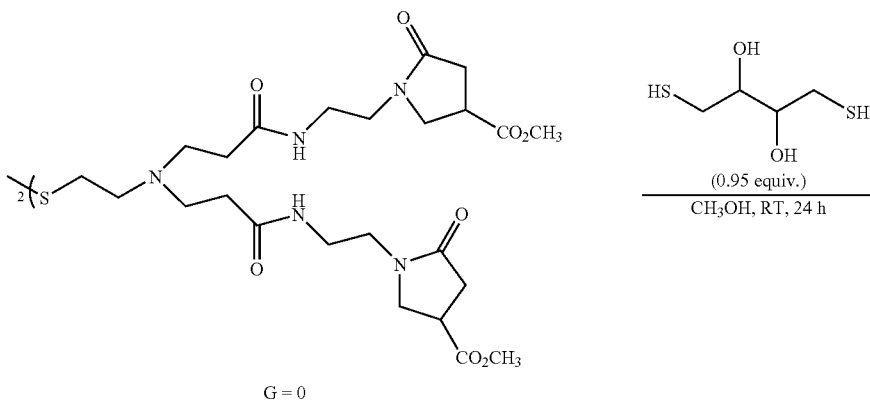

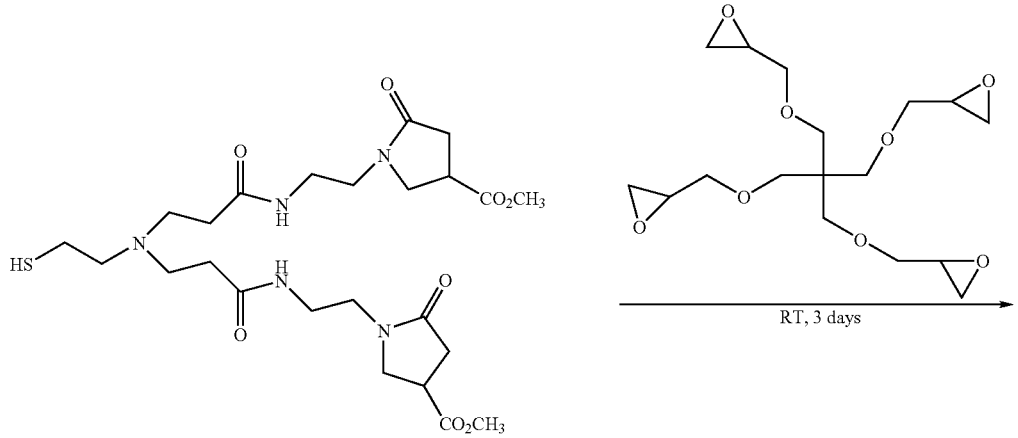

-continued
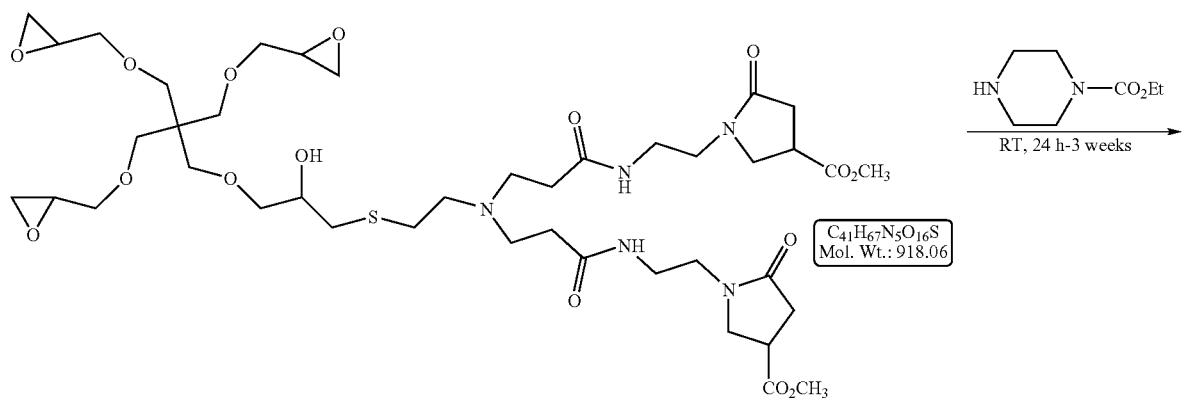
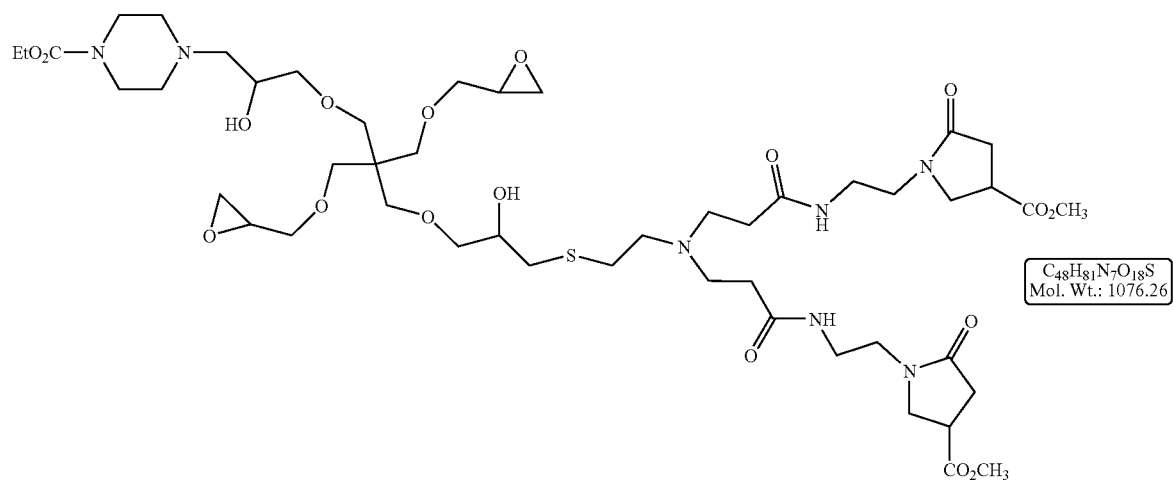
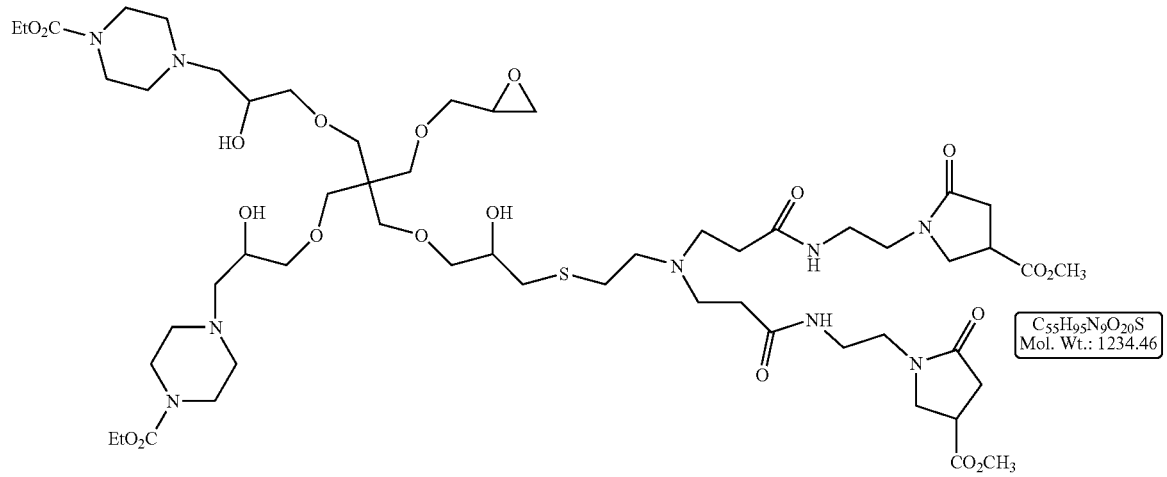

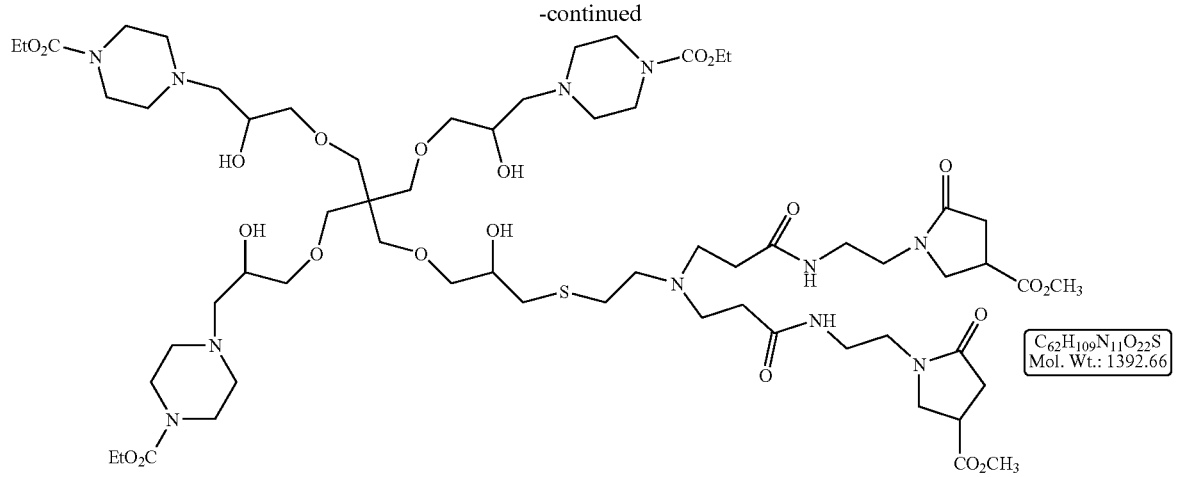

Example 11

Addition of Cystamine Core Pyrrolidone Surface (G=1) Dendron to Pentaerythritol Tetraglycidyl Ether (PETGE) to form a Janus Dendrimer

[(core)=sulfur; PEHAM G=1, surface=epoxy; PAMAM G=2, surface=pyrrolidone]

To a stirring solution of cystamine core (G=1.0) dendrimer (0.600 g, 0.24 mmol) in dry methanol (purged with $N_2$) in a 50 mL, single necked RB was added DTT (0.035 g, 0.225 mmol) all at once. The reaction mixture was stirred overnight at RT. TLC (3:1 mixture of DCM, methanol & 10 drops of $NH_4OH$) with Ellman's reagent. It indicated that consumption of DTT had occurred. After 20 h, a solution of pentaerythritol tetraglycidyl ether (PETGE) (0.032 g, 0.75 equiv./—SH) in 1 mL of dry methanol, which was purged with $N_2$ for 10 min, was added over a period of 10 minutes. Stirring continued at RT, after 19 h TLC indicated only trace amount of PETGE and one other major spot. MALDI-TOF showed mass of mono addition product. Reaction mixture was heated at 45° C. for 36 h. MALDI-TOF indicated mass for again only mono addition product at 1648.940 amu (and peaks for dendron & dendrimer-I). See the reaction scheme below.

Scheme Example 11

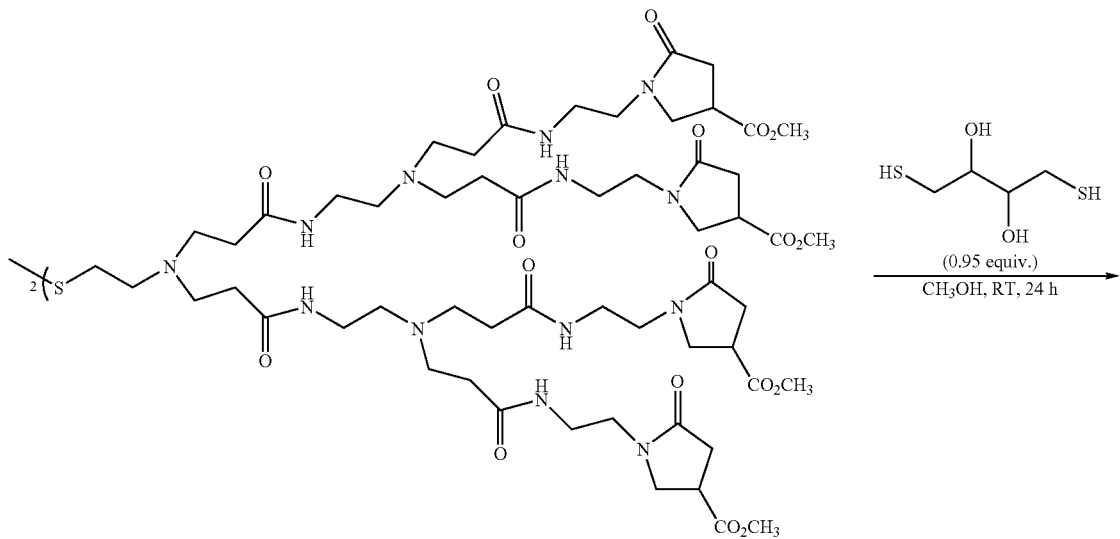

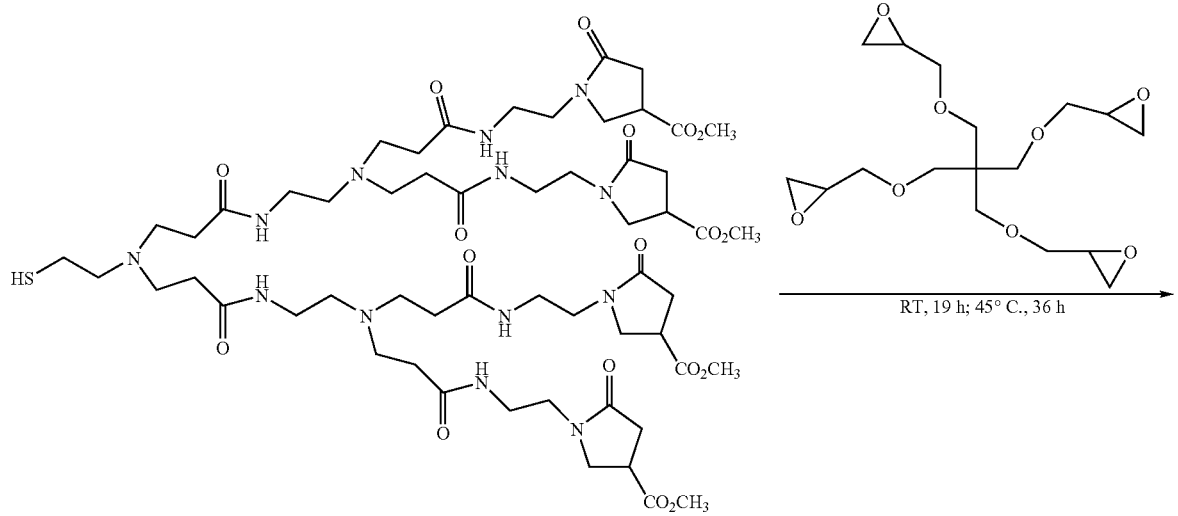

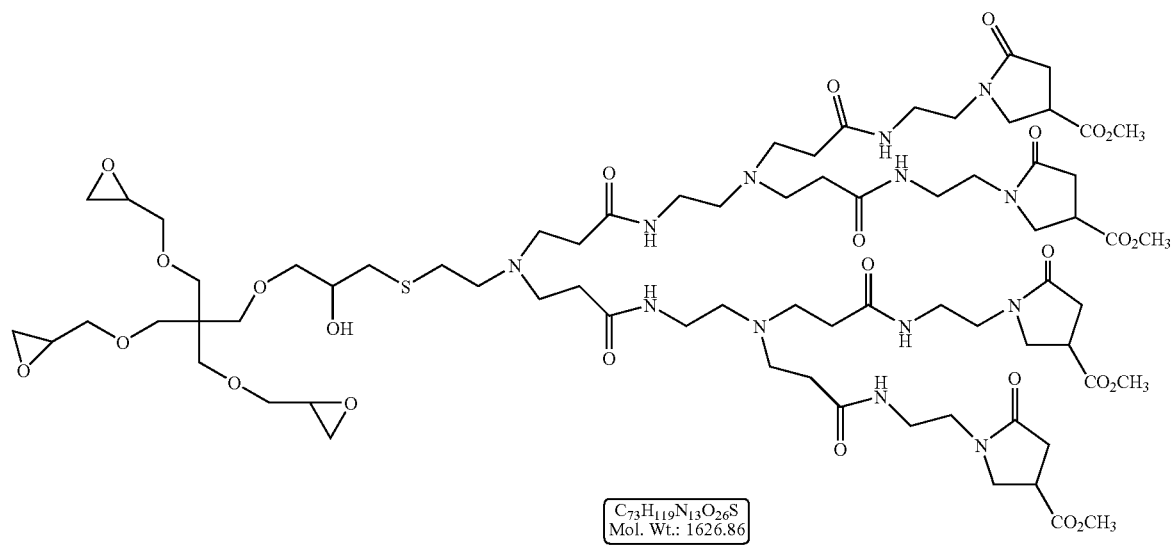

Example 12

Part A

Aqueous NaOH Catalyzed Thiol Addition of Cystamine Core Pyrrolidone Surface (G=0) Dendron to Pentaerythritol Tetraglycidyl Ether (PETGE): (Comparative to Example 9)

[Catalyst Compared with No Catalyst—to Provide a Dendrimer that is a Non-Janus Dendrimer]

An oven dried 50 mL, round bottom flask was charged with cystamine core pyrrolidone surface (G=0) dendrimer (0.478 g, 0.429 mmol), and the flask was equipped with a stir bar and a septum. The flask was flushed with $N_2$ and to it added dry methanol (4 mL) (purged with $N_2$ for about 10 minutes). DTT (0.061 mg, 0.4 mmol) was added into the above reaction mixture all at once and the flask was flushed once again with $N_2$ and stirred for 24 h at RT. Cleavage of S—S bond was confirmed by MALDI-TOF spectrometry.

A solution of pentaerythritol tetraglycidyl ether (PETGE) (0.045 mmol, 0.125 mmol, 0.5 epoxy mmol) in methanol (1 mL) was added into the above reaction mixture through syringe and the reaction mixture was cooled to 5° C. and added 5% NaOH (0.5 mL). Reaction mixture was gradually allowed to warm to RT and stirred for overnight. At this time MALDI-TOF spectrometry indicated mass at 2543.735 amu for tetra addition product along with some amount of tri addition product at 1999.238 amu. From MALDI-TOF it was found that the methyl ester group on the pyrrolidone ring was either —$CO_2CH_3$, $CO_2Na$ or $CO_2H$. Stirring was continued for 36 h. See the reaction scheme below.

Scheme Example 12A
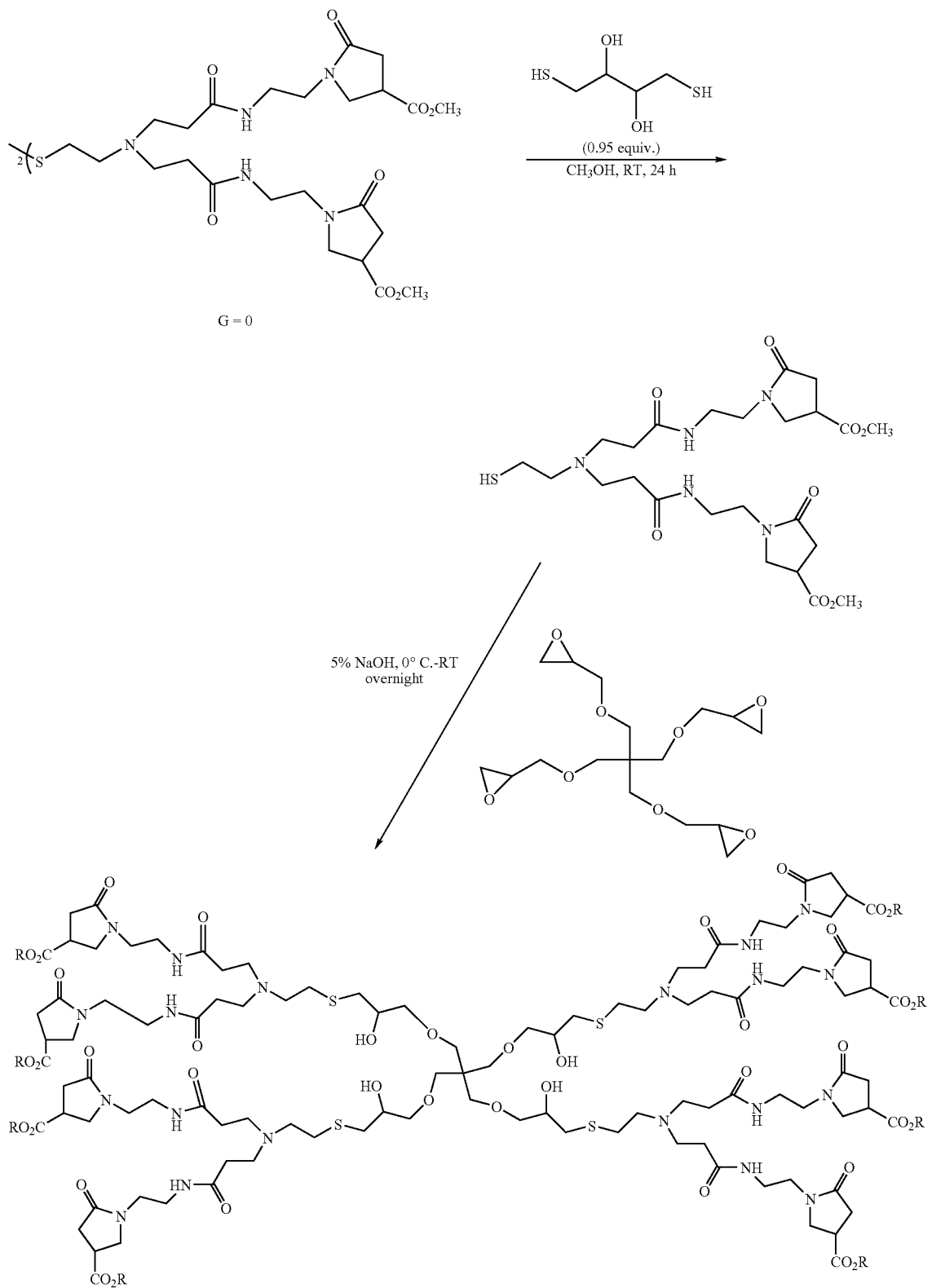
R = CH$_3$, Na or H
C$_{113}$H$_{184}$N$_{20}$O$_{40}$S$_4$
Exact Mass: 2589.19
Mol. Wt.: 2591.04

Part B

Aqueous NaOH Catalyzed Thiol Addition of Cystamine Core Pyrrolidone Surface (G=0) Dendron to Tris(2,3-Epoxypropyl)Isocyanurate (Comparative Example 14)

[Catalyst Compared with No Catalyst—to Provide a Dendrimer that is a Non-Janus Dendrimer]

a) An oven dried 50 mL, round bottom flask was charged with cystamine core pyrrolidone surface (G=0) dendrimer (0.520 g, 0.47 mmol), and the flask was equipped with a stir bar and a septum. The flask was flushed with $N_2$ and to it was added dry methanol (5 mL) (purged with $N_2$ for about 10 minutes). DTT (0.069 mg, 0.45 mmol) was added into the above reaction mixture all at once and the flask was flushed once again with $N_2$ and stirred for 24 h at RT. Cleavage of S—S bond was confirmed by MALDI-TOF spectrometry.

b) Tris(2,3-epoxypropyl) isocyanurate (0.059 g, 0.2 mmol, 0.6 epoxy mmol) was added into the above reaction mixture and heated at 80° C. for 20 h. MALDI-TOF MS analysis indicated all three possible products. At this time, ten drops of 5% NaOH solution was added into the reaction mixture and stirred for overnight at RT. MALDI-TOF MS analysis indicated only tri-addition product at 1950.324 amu. Solvent was removed on a rotary evaporator and subjected to Sephadex™ LH-20 in methanol. See the reaction scheme below.

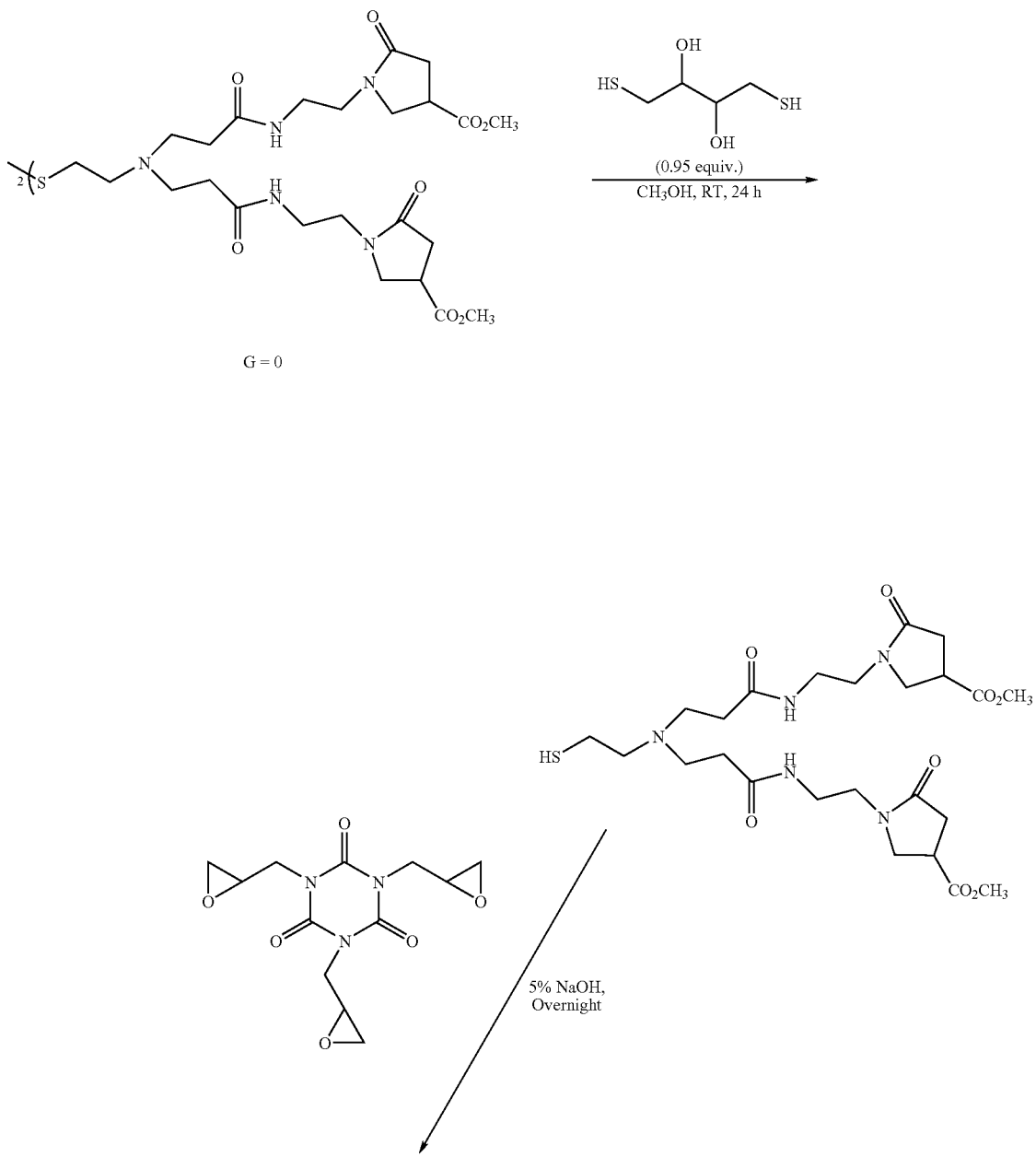

Scheme Example 12B

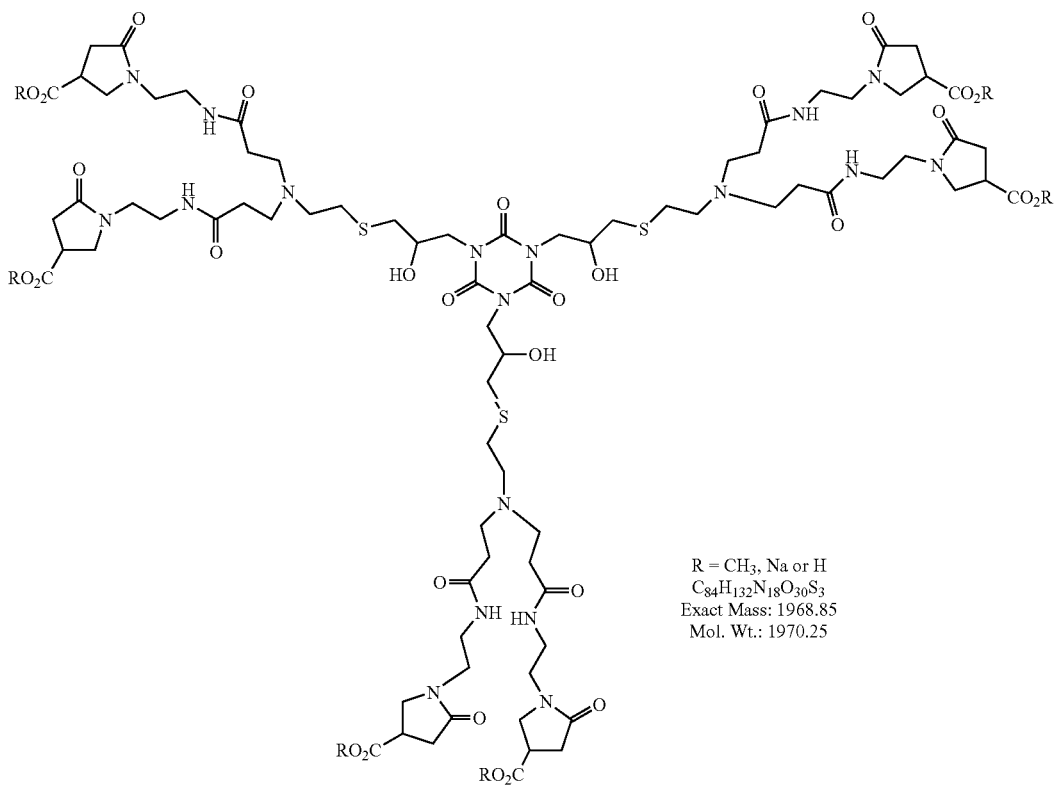

R = CH₃, Na or H
$C_{84}H_{132}N_{18}O_{30}S_3$
Exact Mass: 1968.85
Mol. Wt.: 1970.25

Example 13

Part A

Synthesis of 1,3,5-Tris-(3-diallylamine-2-hydroxy-propyl)-[1,3,5]triazinane-2,4,6-trione from (III) from Tris(2,3-epoxypropyl)isocyanurate (I) and Bis-allylamine

[Starting Material for Janus Dendrimer]
A 50 mL single necked round bottom flask was charged with Bis-allylamine (5.82 g or 7.37 mL, 60 mmol) and methanol (20 mL). The flask was equipped with stir bar and to it was added Tris(2,3-epoxypropyl)isocyanurate (2.97 g, 10 mmol, 30 epoxy mmol) all at once. The flask was arranged with a refluxing condenser. Initially isocyanurate was not soluble but it dissolved after heating at 60° C. about a hour. Heating was continued for 1 day. MALDI-TOF analysis indicated mass for only product-m below. The solvent and excess of Bis-allylamine was removed on a rotary evaporator, followed by being dried under high vacuum, which gives product-E below as a pale yellow colored viscous liquid (5.8 g, 98.6%).

Scheme Example 13A

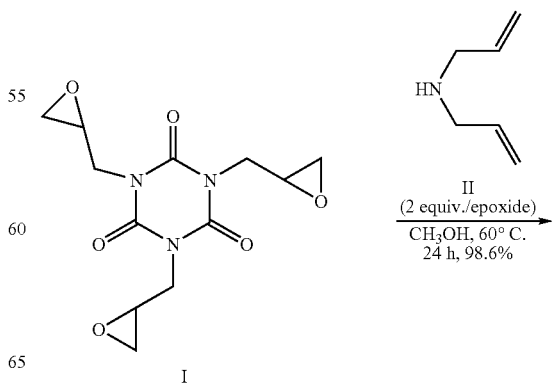

-continued

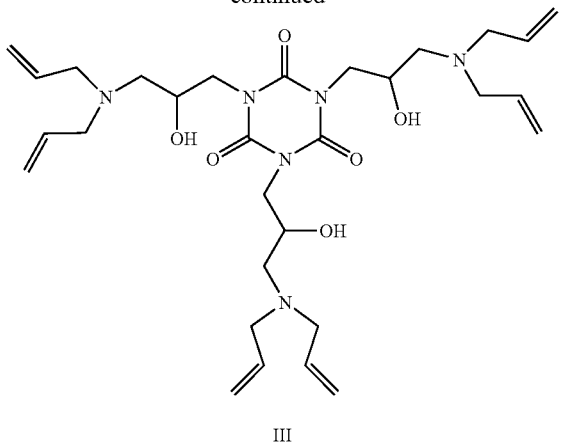

III

Compound III is characterized by:

$^1$H NMR (500 MHz, CDCl$_3$): 2.47-2.53 (6H, m), 3.06 (6H, dd, J=7.00 & 7.00 Hz) 3.22 (6H, dd, J=6.00 & 6.00 Hz), 3.84-3.87 (3H, m), 3.99 (4.00 (3H, m), 4.05-4.10 (3H, m), 5.14-5.18 (12H, m), 5.76-5.84 (6H, m).

$^{13}$C NMR (125 MHz, CDCl$_3$): δ 47.16, 56.84, 56.89, 56.93, 57.17, 65.80, 111.37, 135.13, 149.88, 149.91.

IR (Neat): ν$_{max}$ 3421, 3083, 3006, 2975, 2924, 2806, 1695, 1644, 1460, 1413, 1357, 1311, 1255, 1157, 1065, 999, 968, 917, 860, 835, 763 cm$^{-1}$.

MALDI-TOF: C$_{30}$H$_{48}$N$_6$O$_6$ Calc. 588.74. found 589.440 (M+H) and 611.426 (M+Na).

Part B

Thiol addition of cystamine core pyrrolidone surface (G=0) dendron to 1,3,5-Tris-(3-diallylamine-2-hydroxy-propyl)-[1,3,5]triazine-2,4,6-trione

[(core)=isocyanurate; PEHAM G=1, surface=allyl; PAMAM G=2, surface=pyrrolidone]

a) Dendrimer (G=0) (0.557 g, 0.5 mmol) and dry methanol (5 mL) (bubbled with N$_2$ for 10 min) were taken in a 50 mL, single necked RB and flushed with N$_2$. DTT (0.072 g, 0.47 mmol) was added into the above reaction mixture all at once. The flask was again flushed with N$_2$ and stirred for 24 h at RT under N$_2$ atmosphere. Cleavage of the dendrimer was confirmed by MALDI-TOF spectroscopy.

b) An oven dried 50 mL round bottom flask was charged with 1,3,5-Tris-(3-diallylamine-2-hydroxy-propyl)-[1,3,5]triazine-2,4,6-trione (0.0735 g, 0.125 mmol, 0.75 allyl mmol). The flask was equipped with a stir bar, septum and flushed with N$_2$. Then to it was added dry THF (2 mL) and AIBN (0.016 g, 10 mol %/HSR, Aldrich). Reaction mixture from step Part B(a) was transferred into the above reaction mixture by a syringe. The flask was equipped with a refluxing condenser and heated at 80° C. under N$_2$ atmosphere for overnight. At this time MALDI-TOF spectrometry showed mass for only tri-addition product at 2284.452 amu. Heating continued for 2 days and found the same results. See the reaction scheme below.

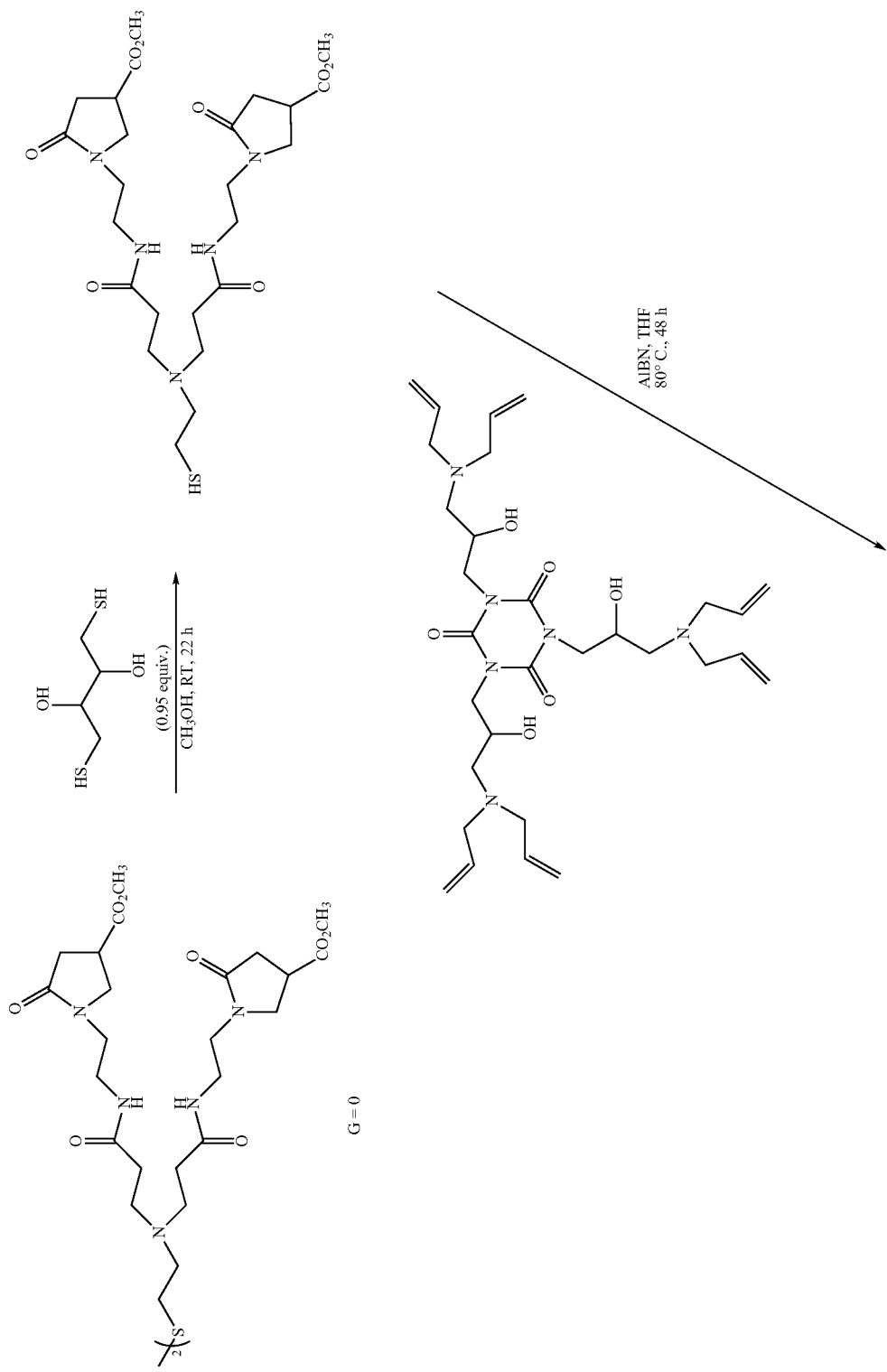

-continued
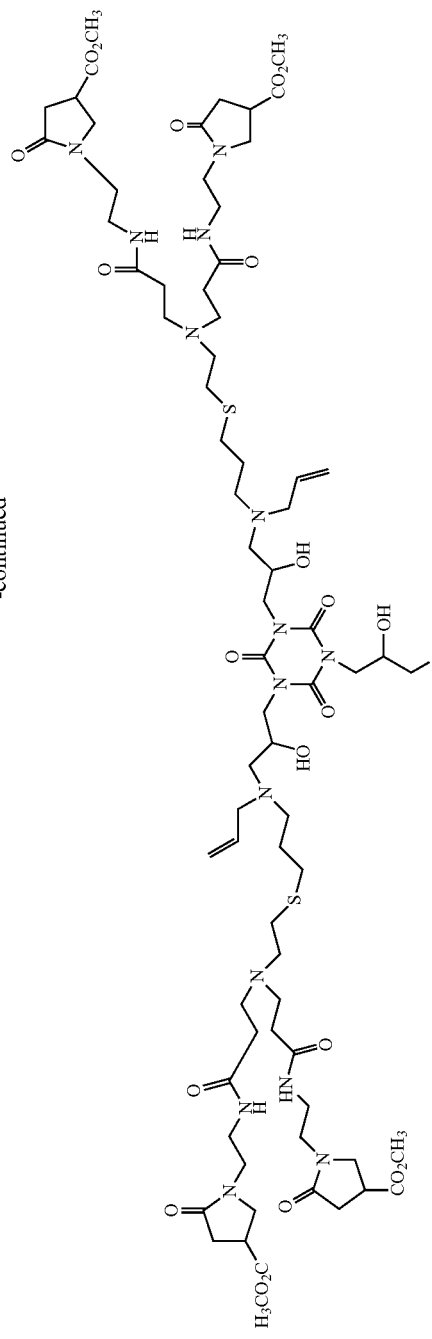
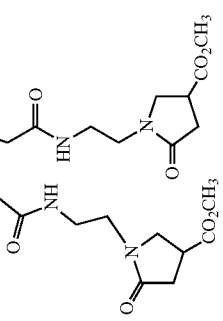
$C_{102}H_{165}N_{21}O_{30}S_3$
Exact Mass: 2260.12
Mol. Wt.: 2261.72

Part C

Thiol addition of cystamine core pyrrolidone surface (G=0) dendron to Triallyl-s-triazine-2,4,6(1H,3H,5H)-trione

[(core)=sulfur; PAMAM G=1, surface=pyrrolidone; PEHAM G=1, surface allyl-intermediate Janus dendron]

This reaction was done as shown by the following reaction scheme.

a) A oven dried 50 mL, round bottom flask was charged with cystamine core pyrrolidone surface (G=0) dendrimer (0.557 g, 0.5 mmol), and the flask was quipped with a stir bar and septum. The flask was flushed with $N_2$ and to it was added dry methanol (5 m/L) (purged with $N_2$ for about 10 minutes). DTT (0.072 g, 0.47 mmol, Acros Organics) was added into the above reaction mixture all at once. The flask was again flushed with $N_2$ and stirred for 24 h at RT. Cleavage of the S—S bond was confirmed by MALDI-TOF spectrometry.

b) A oven dried 50 mL, round bottom flask was charged with Triallyl-s-triazine-2,4,6(1H,3H,5H)-trione (0.62 g, 0.25 mmol, 0.75 allyl mmol, Aldrich) and dry THF (2 mL, Aldrich). The flask was flushed with $N_2$ and added AIBN (0.016 g, 10 mol %, Aldrich). The reaction mixture from step-(a) was transferred by syringe. The flask was arranged with a refluxing condenser and $N_2$ inlet and heated at 80° C. for 2 days. MALDI-TOF MS analysis indicated only mono addition product at 807.521 amu.

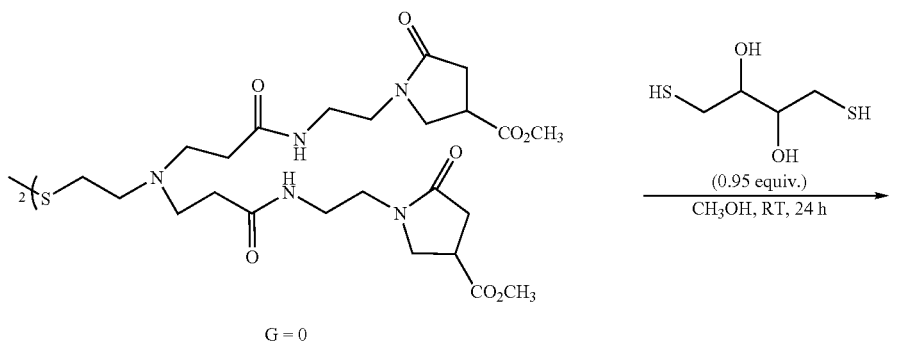

Scheme Example 13C

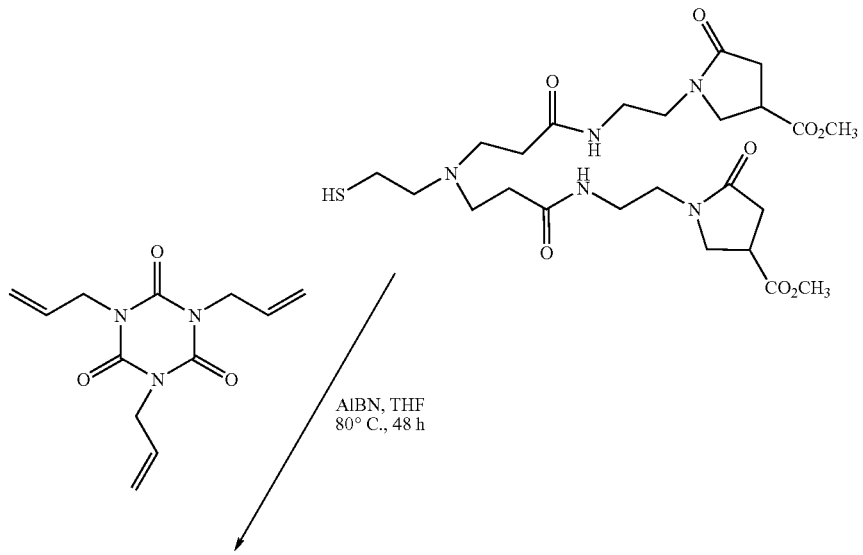

-continued

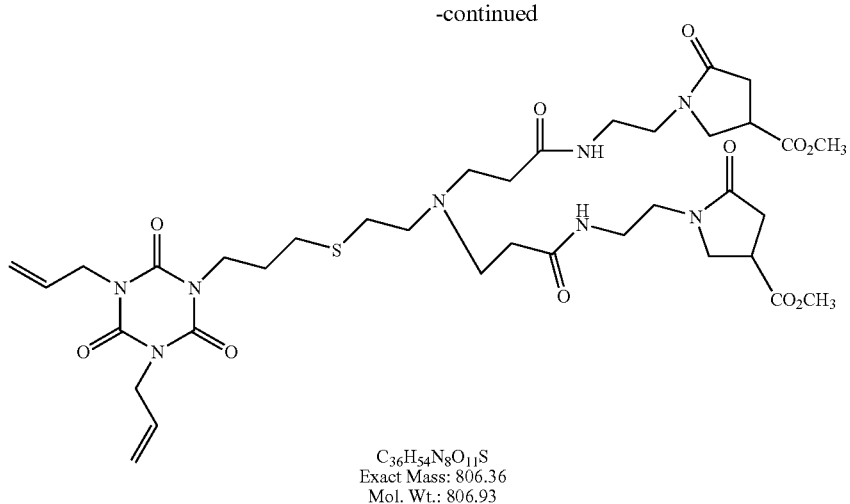

C$_{36}$H$_{54}$N$_8$O$_{11}$S
Exact Mass: 806.36
Mol. Wt.: 806.93

The mono-addition product was confirmed by MALTI-TOF mass spectrum at 807.521 amu.

Part D

Thiol Addition of Cystamine Core Pyrrolidone Surface (G=0) Dendron to Bis-Allyamine

[core]=sulfur; PAMAM G=1, surface=pyrrolidone; having an allylamine entity of a Janus dendron]

This product was prepared as shown by the following scheme.

To a oven dried 50 mL, single neck round bottom flask was added bis-allylamine 0.024 g, 0.5 allyl mmol, Aldrich), dry THF (2 mL, Aldrich) and AIBN (0.016 g, 10 mol %, Aldrich). The flask was flushed with N$_2$ and then transferred a solution of dendron (0.869 g, 0.78 mmol) in methanol (which was prepared by usual procedure) by syringe. The flask was arranged with refluxing condenser, N$_2$ inlet and outlet and heated at 65° C. for overnight. MALDI-TOS MS spectrometry analysis indicated mass for mono-addition product and no bis-addition product was observed.

Scheme Example 13D

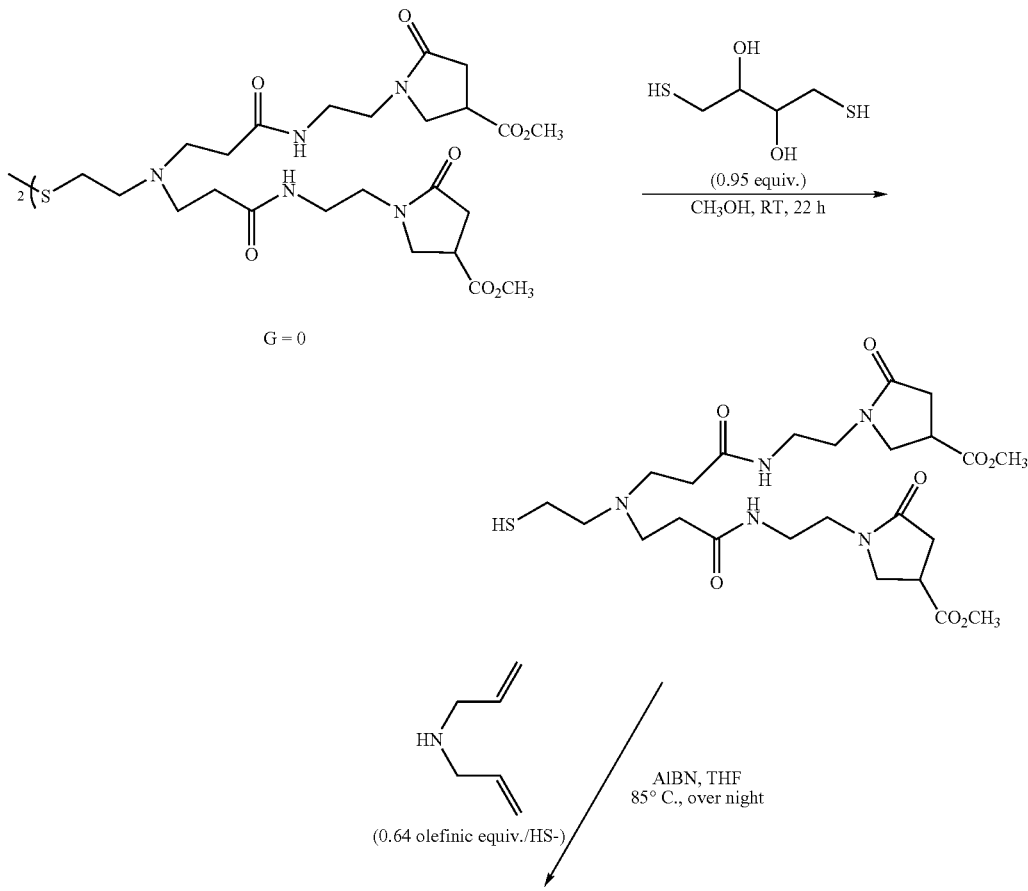

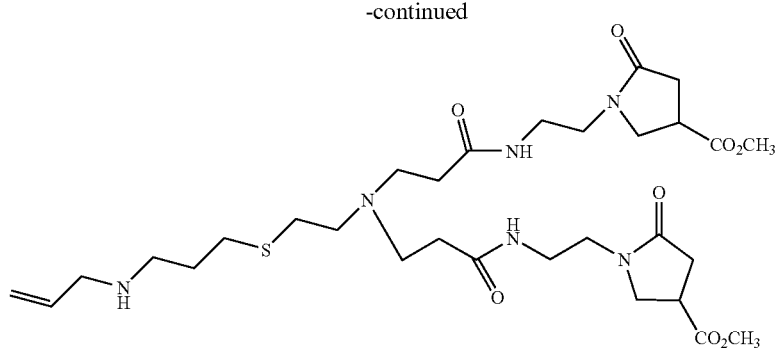

C30H50N6O8S
Exact Mass: 654.34
Mol. Wt.: 654.82

The mono-addition product was confirmed by MALTI-TOF mass spectrum at 655.351 amu.

Example 14

Thiol Addition of Cystamine Core Pyrrolidone Surface (G=1) Dendron to Tris(2,3-Epoxypropyl)Isocyanurate

[(core)=sulfur; PEHAM G=1, surface=epoxy; PAMAM G=2, surface=pyrrolidone]

a) Dendrimer was taken in a 50 mL single necked round bottom flask and dissolved in dry methanol (5 ml, degassed with purging $N_2$ for about 10 minutes). DTT was added into the reaction mixture all at once. The flask was flushed with $N_2$, closed with a septum and stirred at RT for 22 h.

b) Tris(2,3-epoxypropyl)isocyanurate was added into a solution of above G=1.0 dendron all at once and stirred at RT. Progress of the reaction was monitored after 1 and 5 days by MALDI-TOF analysis that showed mass for mono-addition product at 1585.925 amu and for excess of dendron and dendrimer. The reaction mixture was then heated at 45° C. for 1 day and treated with 5% NaOH solution and found the same results. See the reaction scheme below.

Scheme Example 14

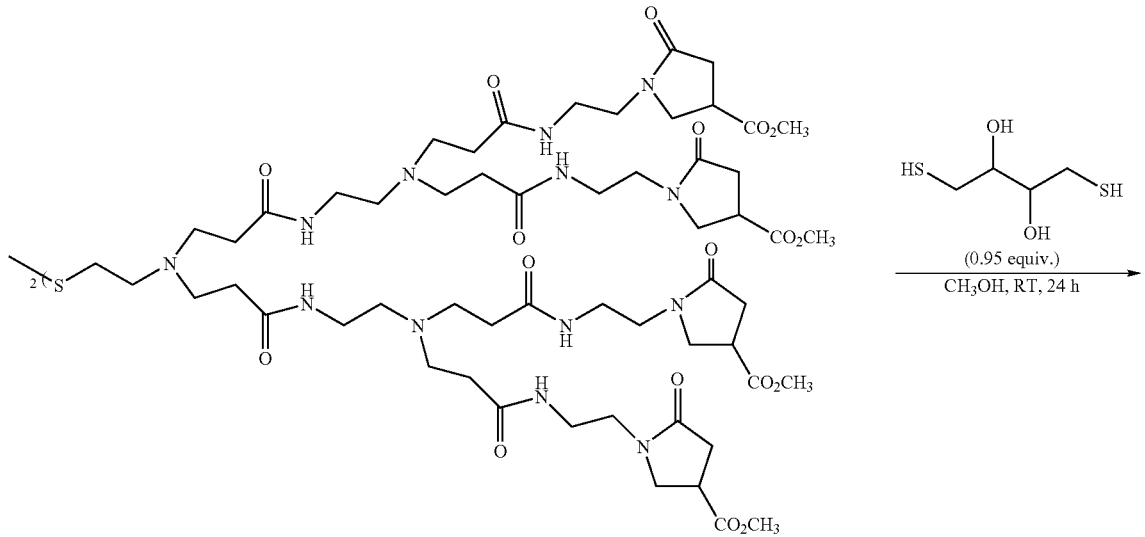

G = 1

-continued

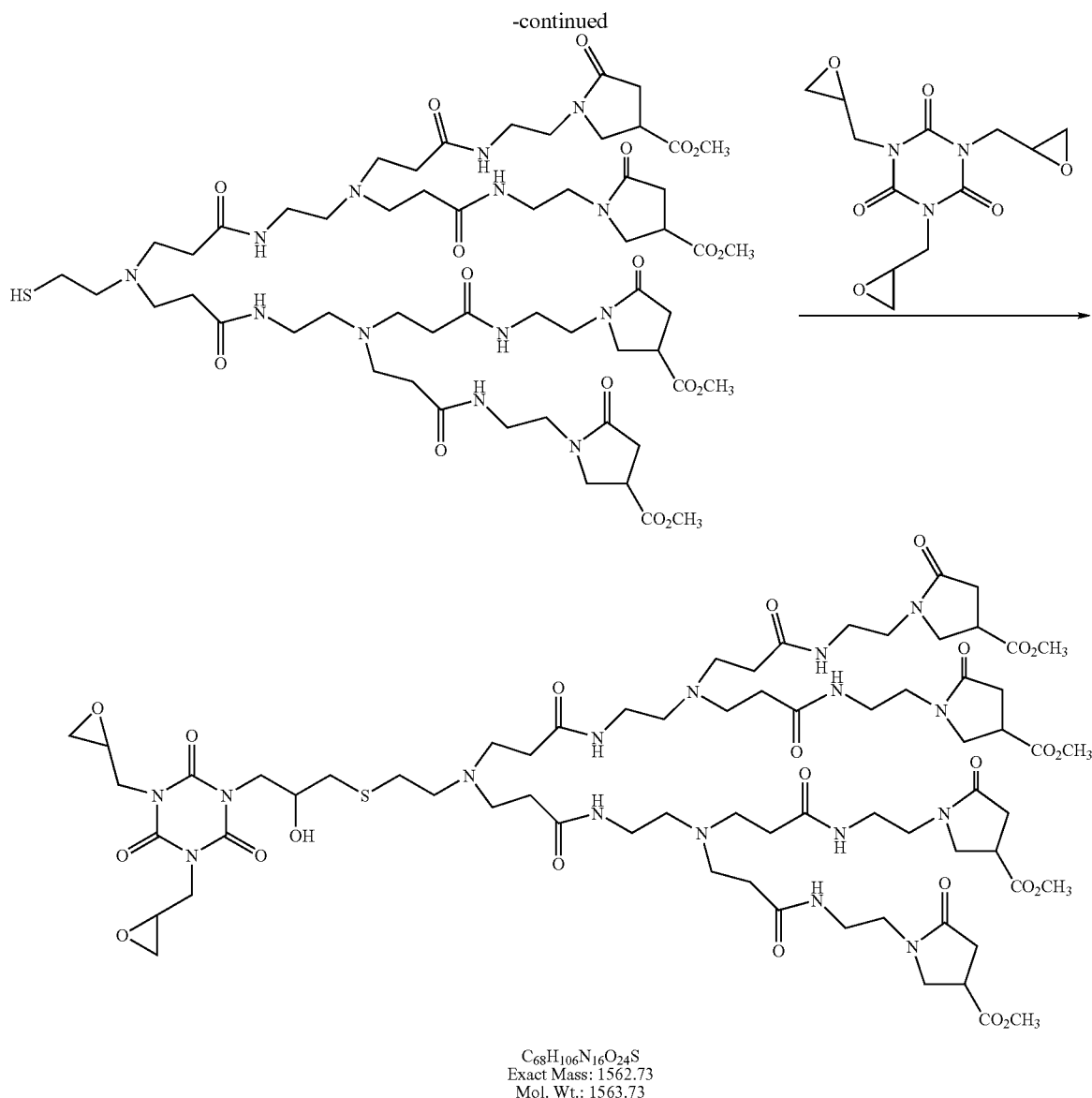

C₆₈H₁₀₆N₁₆O₂₄S
Exact Mass: 1562.73
Mol. Wt.: 1563.73 other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A dendritic polymer that is a Janus dendrimer comprising at least two dissimilar dendrons joined at their core, with or without a connecting group, wherein at least two of the dendrons provide, a heterobifunctional character and at least one dendron is a PEHAM dendron, wherein the PEHAM dendron comprises:
   a) interior functionality formed from a ring opening reaction that can covalently bind carried materials at lower generations; and
   b) optionally, extender present in its layered growth that increases its void volume at lower generations; and
   c) a different reactivity than other dendrons used in the Janus dendrimer due to its NSIS properties; and
   d) formed by use of click reactions; and
   e) holds carried material at lower generations than other dendrimers due to its interior functionality and larger void volume at a lower generation; and
   g) has greater amplification; and
   h) has more functionality per gram of material; and
   where the dendron possesses focal point functional (FF) groups selected from the group consisting of epoxy, aziridine, episulfide, activated Michael's addition olefins, and oxazolines that may be suitable for click chemistry ligations, or possesses an organic azide or a terminal alkyne group at the focal point functionality (FF) suitable for 1,3-dipolar cycloaddition reactions.

2. The dendritic polymer of claim 1 wherein the core is joined with a connecting group.

3. The dendrimer of claim 1 wherein at least two different dendritic polymers are present.

4. The dendrimer of claim 1 or 3 wherein at least one dendron is a PAMAM dendron, and at least one dendron is a PEHAM dendron.

5. The dendrimer of claim 1 for use as one or more of the following: a combinatorial library of bifunctional structures; or combined target director and signaling dendrimers; or specific targeting entities for diagnostic and/or therapeutic applications.

6. An intermediate for preparing, a Janus dendrimer claim 1 comprising at least one N-SIS dendron having at least one reactive fecal moiety (RFM) present either from its core or a connecting group that is capable of further reaction to form a Janus dendrimer or to react with another reactive moiety, where the intermediate possess either an organic azide or a terminal alkyne group at the focal point functionality (FF) suitable for 1,3-dipolar cyclo-addition reactions.

7. A formulation wherein the Janus dendrimer of claim 1 is formulated into tablets, ampoules, ointments, gels, suspensions, emulsions, injections, transdermal formulations, intranasal formulations, ocular applications or application in a gauze, wipe, spray or other means at site of surgical incision, near scar formation sites, or site of a tumor growth or removal, and as kits, having customary pharmaceutically-acceptable salts, adjuvants, binders, desiccants, diluents and excipients.

* * * * *

UNITED STATES PATENT AND TRADEMARK OFFICE
CERTIFICATE OF CORRECTION

| | |
|---|---|
| PATENT NO. | : 7,977,452 B2 |
| APPLICATION NO. | : 11/885244 |
| DATED | : July 12, 2011 |
| INVENTOR(S) | : Donald A. Tomalia et al. |

It is certified that error appears in the above-identified patent and that said Letters Patent is hereby corrected as shown below:

At column 63, line 64, claim 1, before "extender" insert --an--; and

At column 65, line 8, claim 6, change "fecal" to --focal--.

Signed and Sealed this
Sixth Day of September, 2011

David J. Kappos
*Director of the United States Patent and Trademark Office*